United States Patent
Lyu

(10) Patent No.: US 6,885,691 B1
(45) Date of Patent: Apr. 26, 2005

(54) SCRAMBLING CODES AND CHANNELIZATION CODES FOR MULTIPLE CHIP RATE SIGNALS IN CDMA CELLULAR MOBILE RADIO COMMUNICATION SYSTEM

(75) Inventor: Dug In Lyu, Kyonggi-do (KR)

(73) Assignee: LG Information & Communications, Ltd., Seoul (KR)

( * ) Notice: Subject to any disclaimer, the term of this patent is extended or adjusted under 35 U.S.C. 154(b) by 526 days.

(21) Appl. No.: 09/630,543

(22) Filed: Aug. 1, 2000

(30) Foreign Application Priority Data

| Aug. 2, 1999 | (KR) | 1999-31733 |
| Dec. 30, 1999 | (KR) | 1999-67260 |
| Mar. 22, 2000 | (KR) | 2000-14577 |

(51) Int. Cl.$^7$ ............................................. H04B 1/02
(52) U.S. Cl. ........................................................ 375/130
(58) Field of Search .................................. 375/130, 135, 375/140, 141, 146

(56) References Cited

U.S. PATENT DOCUMENTS

| 6,061,387 A | * | 5/2000 | Yi | 375/142 |
| 6,091,757 A | * | 7/2000 | Cudak et al. | 375/130 |
| 6,108,369 A | * | 8/2000 | Ovesjo et al. | 375/146 |
| 6,163,524 A | * | 12/2000 | Magnusson et al. | 370/208 |
| 6,185,246 B1 | * | 2/2001 | Gilhousen | 375/200 |
| 6,233,231 B1 | * | 5/2001 | Felix et al. | 370/335 |
| 6,266,321 B1 | * | 7/2001 | Pehkonen et al. | 370/206 |
| RE37,420 E | * | 10/2001 | Asano et al. | 375/144 |
| 6,298,051 B1 | * | 10/2001 | Oenwalder et al. | 370/342 |
| 6,324,159 B1 | * | 11/2001 | Mennekens et al. | 370/203 |

(Continued)

FOREIGN PATENT DOCUMENTS

WO    WO 99/04525    1/1999

OTHER PUBLICATIONS

Schotten et al., "Analysis of a CDMA Downlink with Non–Orthogonal Spreading Sequences for Fading Channels", Vehicular Technology Conference Proceedings, IEEE 2000, May 2000, Tokyo, vol. 2, pp. 1782–1786.*
Piechocki et al., "Orthogonal Re–Spread for Uplink WCDMA Beamforming", Vechicular Technology Conference Proceedings, IEEE 2000, May 2000, Tokyo, vol. 2, pp. 1373–1376.*
Cheng et al., "OVSF Channel Assignment for IMT–2000", Vehicular Technology Conference Proceedings, IEEE 2000, May 2000, Tokyo, vol. 3, pp. 2188–2192.*
Piechocki et al., "Improving the Direction–of–Arrival Resolution Via Double Code Filtering in WCDMA", 1st International Conference on 3G Mobile Communication Technologies (IEEE Conference Publ. #471), Mar. 27–29, 2000, pp. 204–207.*
Harry Newton, "Newton's Telecom Dictionry", published by CMB Books, ISBN # 1–57820–069–5, pp. 43.*
X.H. Chen, et al; "Multiple chip–rate DS/CDMA system and its spreading code dependent performance analysis;" IEE Proc.–Commun., vol. 145, No. 5, Oct. 1988, pp. 371–377.

*Primary Examiner*—Mohammed Ghayour
*Assistant Examiner*—Dung X. Nguyen
(74) *Attorney, Agent, or Firm*—Fleshner & Kim, LLP

(57) ABSTRACT

A system and method for allocating channelization code and scrambling code in multiple code rates is disclosed. In the present invention, many user signals that have various chip rates in overlaid frequency band can be transmitted with minimum interference between users, by allocating orthogonal spreading code in which the sum of bits for a period that is determined by the ratio of chip rates is canceled respectively, as channelization codes.

28 Claims, 13 Drawing Sheets

U.S. PATENT DOCUMENTS

| | | | |
|---|---|---|---|
| 6,347,112 B1 * | 2/2002 | Lattard et al. | 375/146 |
| 6,366,588 B1 * | 4/2002 | Gans et al. | 370/468 |
| 6,377,539 B1 * | 4/2002 | Kang et al. | 370/209 |
| 6,400,755 B1 * | 6/2002 | Harris et al. | 375/146 |
| 6,404,732 B1 * | 6/2002 | van Nee | 370/209 |
| 6,459,693 B1 * | 10/2002 | Park et al. | 370/342 |
| 6,501,788 B1 * | 12/2002 | Wang et al. | 375/148 |
| 6,504,832 B1 * | 1/2003 | Koo et al. | 370/342 |
| 6,526,065 B1 * | 2/2003 | Cheng | 370/441 |
| 6,560,194 B1 * | 5/2003 | Gourgue et al. | |
| 6,563,808 B1 * | 5/2003 | Cox et al. | 370/335 |
| 6,671,266 B1 * | 12/2003 | Moon et al. | 370/342 |
| 6,693,952 B1 * | 2/2004 | Chuah et al. | 375/140 |

* cited by examiner

SCRAMBLING CODES AND CHANNELIZATION CODES FOR MULTIPLE CHIP RATE SIGNALS IN CDMA CELLULAR MOBILE RADIO COMMUNICATION SYSTEM

BACKGROUND OF THE INVENTION

1. Field of the Invention

This invention pertains to the field of wireless digital communication systems, and more particularly, to a method and system for transmitting user signals having various chip rates over carrier frequency band by assigning a channelization code to each user signal.

2. Description of the Related Art

Generally a multiple access communication system transmits or receives information sequences of many users over a same frequency band. Particularly, in a wireless digital communication system using a Code Division Multiple Access (CDMA), a multiple number of users share a common bandwidth of W Hz carrier frequency.

In a CDMA system, a unique binary spreading sequence (a code) is assigned to each user signals of each call. Multiplied by an assigned channelization code, a user signal is "spread" onto a channel bandwidth which is much wider than the user signal bandwidth. The transmitting rate of the assigned channelization code is commonly called "the chip rate" and the chip rate is higher than the bit rate, which is the transmitting rate of the user data.

All active users share the same system bandwidth frequency spectrum at the same time. Thus, the signal of each user is separated from others at the receiver using a correlator matched with the associated channelization code to "de-spread" desired signals. The de-spread signal is then integrated during a chip period.

The ratio of the chip rate to the user bit rate is commonly called the "spreading factor" (SF). The spreading factor represents the length of the assigned channelization code.

While the receiver multiplies the associated channelization code sequence to the user signal for the despreading, the components of other user signals may still remain as noises due to interference or error. These noise can significantly be diminished after passing de-spread signal through an integrator of the receiver.

Thus, if each user signal is synchronized to others and the chip rate of every user signal is same, the interference between user signal data in a CDMA communication system can be removed by allocating code sequences for all users which are orthogonal to each another.

Accordingly, an Orthogonal Variable Spreading Factor (OVSF) code can be applied to the CDMA system. The OVSF code allows the SF of each user signal and the transmitting rate of the user data, i.e. the bit rate, to be different from one another.

FIG. 1 shows a spreader in a transmitter of a CDMA communication system in the related art. Referring to FIG. 1, $b_k(t)$ is the data signal of user k and $a_k(t)$ is a spreading signal of user k. The data signal $b_k(t)$ of user k is spread by being multiplied with the spreading signal $a_k(t)$, and a spread signal of s(t) of all users are transmitted through a same system channel bandwidth frequency spectrum. The spread signal s(t) of all users can be expressed with the following equation.

$$s(t) = \sum_{l=1}^{K} a_k(t) \cdot b_k(t) \cdot \cos\omega_c t, \quad \text{[Equation 1]}$$

where K is the number of total users, and $\omega_c$ is the carrier frequency.

The $a_k(t)$ and $b_k(t)$ can be expressed as follows.

$$a_k(t) = \sum_{j=-\infty}^{\infty} a_{k,j} \Psi(t - jT_c), \quad \text{[Equation 2]}$$

where $a_{k,j}$ is the jth chip of the channelization code allocated to the kth user which has alternative value of 1 or −1, $\Psi(t)$ is an impulse of the pulse shaping filter, t is an intermediate variable for time, and $T_c$ is the chip period which is a reciprocal of the chip rate. The $a_{k,j}$ has a period of $SF_k$ (i.e. $a_{k,j}=a_{k,j}+SF_k$ where k=1, 2, . . . , K). The chip period of all user data is assumed to be the same in the CDMA system of the related art. Also, assuming that the duration of pulse shaping function is equal to chip duration (i.e. $\Psi(t)=0$ for t<0 or $t \geq T_c$).

$$b_k(t) = \sum_{m=-\infty}^{\infty} b_{k,m} P_k(t - mT_k), \quad \text{[Equation 3]}$$

where $b_{k,m}$ is the mth data bit of the kth user which has alternative value of 1 or −1, $T_k$ is the data bit duration of the kth user which is a reciprocal of data bit, and $P_k(t)$ is the rectangular pulse function which is 1 for $0 \leq t < T_k$ and 0 otherwise. It is assumed that all users are time-synchronized in order to preserve the orthogonality of OVSF codes.

FIG. 2 shows a de-spreader in a receiver of a conventional CDMA communication system. Referring to FIG. 2, the input signal of the receiver r(t) can be expressed with the following equation.

$$r(t) = A(t)s(t - \tau) + n(t), \quad \text{[Equation 4]}$$

where A(t) is a distortion caused when the user signal passes a physical channel, τ is the propagation time delay, and n(t) is the additive white Gaussian noise.

The input signal r(t) of the receiver is multiplied by the desired user spreading signal or code $a_i(t)$ and integrated for a data bit duration, where i is the desired user index. If so, the other user signals except the desired user signal are eliminated and the user data signal can be extracted.

For simplification, assume the parameter of distortion equals 1 (A(t)=1), a zero time delay (τ=0), and the noise equals zero (n(t)=0). Then, the nth output $Z_i(nT_i)$ of the receiver for user i can be expressed as follows.

$$Z_i(nT_i) = b_{i,n} + I_{k,i}(nT_i), \quad \text{[Equation 5]}$$

where the interference $I_{k,i}(nT_i)$ is the component due to the kth user signal and can be expressed as follows.

$$I_{k,i}(nT_i) = \frac{1}{T_i} \cdot \int_0^{T_0} \psi^2(t)dt \cdot \sum_{m=\alpha_{k,i}}^{\beta_{k,j}} b_{k,m} R_{k,i}(m), \quad \text{[Equation 6]}$$

where $$\alpha_{k,i} = \lfloor nT_i/T_k \rfloor$$

$$\beta_{k,i} = \begin{cases} \lfloor nT_i/T_k \rfloor, & T_i \le T_k \\ \lfloor (nT_i+T_i)/T_k \rfloor - 1, & T_i > T_k \end{cases}$$

$$R_{k,i}(m) = \begin{cases} \sum_{r=nN_i}^{(n+1)N_i-1} a_{k,r} a_{i,r}, & T_i \le T_k \\ \sum_{r=mN_k}^{(m+1)N_i-1} a_{k,r} a_{i,r}, & T_i > T_k \end{cases}$$

in which $\lfloor x \rfloor$ is the maximum integer which is equal to or less than x.

To obtain the Interference signal $I_{k,i}(nT_i)$, the value is held to be zero regardless of the transmitted user data bit $b_{k,m}$, and the value of $R_{k,i}(m)$, $m=\alpha_{k,i}, \ldots \beta_{k,i}$ should be equal to zero. The code that satisfies this condition is the OVSF code.

The OVSF code of the condition, $C_{ch,SF,n}$, n=0, 2, ..., SF−1 is shown as a code tree in FIG. 3. Such code tree is disclosed in 3GPP RAN 25.213, V3.0.2 (March 2000), Spreading and modulation (FDD) and is fully incorporated herein. The $C_{ch,1,0}=(1)$ is the beginning of code tree, the two branch code $C_{ch,2,0}$ and $C_{ch,2,1}$ are divided out from the trunk code $C_{ch,1,0}$. That is, the code $C_{ch,2,0}$ is made by repeating code $C_{ch,1,0}$, and $C_{ch,2,1}$ is made by connecting two codes of code $C_{ch,1,0}$ and a code made by multiplying code $C_{ch,1,0}$ with (−1). The branches of the code tree can be extended by making two branches from each branch of the code tree such as code $C_{ch,2,0}$ and code $C_{ch,2,1}$ respectively with the same procedure.

The OVSF code can be generated as follows by using a matrix.

$$C_{ch,1,0} = 1, \quad \text{[Equation 7]}$$

$$\begin{bmatrix} C_{ch,2,0} \\ C_{ch,2,1} \end{bmatrix} = \begin{bmatrix} C_{ch,1,0} & C_{ch,1,0} \\ C_{ch,1,0} & -C_{ch,1,0} \end{bmatrix} = \begin{bmatrix} 1 & 1 \\ 1 & -1 \end{bmatrix}$$

$$\begin{bmatrix} C_{ch,2^{(n+1)},0} \\ C_{ch,2^{(n+1)},1} \\ C_{ch,2^{(n+1)},2} \\ C_{ch,2^{(n+1)},3} \\ \vdots \\ C_{ch,2^{(n+1)},2^{(n+1)},2} \\ C_{ch,2^{(n+1)},2^{(n+1)},1} \end{bmatrix} = \begin{bmatrix} C_{ch,2^n,0} & C_{ch,2^n,0} \\ C_{ch,2^n,0} & -C_{ch,2^n,0} \\ C_{ch,2^n,1} & C_{ch,2^n,1} \\ C_{ch,2^n,1} & -C_{ch,2^n,1} \\ \vdots & \vdots \\ C_{ch,2^n,2^n-1} & C_{ch,2^n,2^n-1} \\ C_{ch,2^n,2^n-1} & -C_{ch,2^n,2^n-1} \end{bmatrix}$$

The procedure to allocate OVSF code to a user channel is accomplished by selecting a code from codes of spreading factor (SF) which is necessary to the user channel, avoiding three types of codes as follows from the code tree. The types of codes to avoid are as follows. First, the codes that are allocated by other channels should be avoided. Second, in the code tree, all descendant codes of the codes used by other users should be avoided. Third, in the code tree, all ancestor codes of the codes used by other users should be avoided.

In systems of the related art, all user chip rates should be the same and all users should be time-synchronized in order to preserve the orthogonality of OVSF codes, as discussed above. However, in practice, the duration of pulse shaping function is longer than the chip rate.

FIG. 4 is block diagram of a transmitter for single chip rate in a Wideband CDMA (WCDMA) communication system in the related. Referring to FIG. 4, the WCDMA communication system in the related art comprises a serial to parallel (S/P) converter (400) which outputs I signal and Q signal from data or control information; first mixer (401) and second mixer (402) which spread data symbol by multiplying I signal and Q signal output from said serial to parallel converter (400) with channelization code; an imaginary number converter (403) which converts the output of said second mixer (402) into an imaginary number; a combining unit (404) outputting complex number signal by combining I signal from said first mixer (401) and Q signal from said imaginary number converter (403); a third mixer (405) scrambling the complex number signal by multiplying scrambling code; a separating unit (406) separating the scrambled complex number signal into real component and imaginary component; first pulse shaping filter (407) and second pulse shaping filter (408) generating chip waveform in order to transmit the separated output signal through a dedicated frequency band; a fourth mixer (409) loading the output signal of said first pulse shaping filter (407) to the carrier wave by multiplying $\cos(\omega_c t)$; and a fifth mixer (410) loading the output signal of said second pulse shaping filter (408) to the carrier wave by multiplying $-\sin(\omega_c t)$.

The function of a WCDMA communication system in FIG. 4 is as follows. At first, a user data and control information are spread by channelization code ($C_{ch,SF,n}$) after separation into I signal and Q signal. After that, the I signal and Q signal are combined to complex number signal, and the combined complex number signal is scrambled by complex-valued scrambling code ($C_{scramb1}$). At this time, the OVSF code is used as a channelization code, which discriminates the channel dedicated to each user. The complex-valued scrambling code can be used to discriminate the transmitter as pseudo-random code.

The complex number scrambled at the third mixer (405) is separated into real number component signal and imaginary number component signal at splitter (406), respectively. After that, the real number component signal is fed to the pulse shaping filter (407) and modulated with carrier frequency oc (409), the imaginary number component signal is also fed to the pulse shaping filter (408) and modulated with carrier frequency $\omega_c$ (410).

At this time, the rate of the channelization code and the complex-valued scrambling code in FIG. 4 is 3.84 Mcps, and each pulse shaping filter (407, 408) generates chip waveform in order to transmit the signal of 3.84 Mcps chip rate through 5 MHz frequency band.

As explained above, the channel signals, spread with channelization code, do not cause inter-signal interference because they retain the property of orthogonal to one another. In these WCDMA systems, there is a continuing need to increase the performance of the system by accommodating users having different source rates.

Because the transmitter of the WCDMA communication system in the related art is designed to transmit only single chip rate, that is 3.84 Mcps signal, it has the problem that it cannot transmit other signal which has multiple chip rates of said single chip rate, namely 7.68 Mcps (double of the single chip rate) and 15.36 Mcps (four times of the single chip rate).

In order to solve this problem, a transmitter of a WCDMA communication system in the related art can be expanded to support transmitting multiple chip rates. FIG. 5 shows a transmitter which is capable of transmitting two chip rates. It can be extended to support more than two chip rates. Since the chip rate in WCDMA system is one of 3.84, 7.68, and 15.36 Mcps, the second chip rate is double or four times of the first chip rate. If the first chip rate is 3.84 Mcps, then the second chip rate can be 7.68 Mcps or 15.36 Mcps. If the first chip rate is 7.68 Mcps, then the second chip rate is 15.36 Mcps.

At this time, each chip rate signal is transmitted after being multiplied by both the channelization code and the complex scrambling code, and passing through a dedicated pulse shaping filter. The OVSF codes are allocated as channelization codes under same procedure described with reference to FIG. 3. Particularly, the channel codes are allocated independently to other chip rate group.

The OVSF code can be used in a system of single chip rate as explained above. However, in consideration of multiple chip rate signals in a carrier frequency band, the method to allocate OVSF code to multiple code rate has not been introduced. Therefore, if the OVSF codes are allocated irregularly to the various signals having different chip rate under the procedure in the related art for generating and allocating the OVSF code, the interference between signal to signal occurs because the codes may not be orthogonal to one another.

If the transmitting device supporting single chip rate is expanded to support multiple chip rate, the interference between signal to signal does not occur among signals of same chip rate because of orthogonal property, but the interference between signal to signal among signals of different chip rates would increase, because the scrambling codes are different from one another and the orthogonal property cannot be sustained between channelization codes.

SUMMARY OF THE INVENTION

Accordingly, an object of the present invention is to solve at least the problems and disadvantages of the related art.

An object of the present invention is to provide a method and system for transmitting data of multiple chip rates in a CDMA mobile communication system.

Another object of the present invention is to provide a method for allocating channelization codes in multiple code rates which discriminates the channel dedicated to each user signal having different code chip rates to minimize interference signal.

A further object of the present invention is to provide a method of allocating channelization codes in multiple code rates which is designed to minimize interference according to the types of pulse shaping functions.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a method of allocating channelization codes for transmission of signals in multiple code rates in a mobile communication system includes generating a set of codes from OVSF codes; allocating OVSF codes as channelization codes for signals of a first chip rate; and allocating the generated set of codes as channelization codes for signals of a second chip rate, where the first chip rate is lower than the second chip rate.

The present invention may further comprise scrambling signals of the first chip rate and signals of the second chip rate with scrambling codes having a same chip rate and a same scrambling code sequence pattern. Here, the scrambling codes of the first chip rate are used for signals of both the first and second chip rates.

In the above embodiment, the second chip rate is $2^Y$ times the first chip rate, where Y is a positive integer. If a pulse shaping function is rectangular, the set of codes are generated by finding codes from the OVSF codes in which a combination of $2^Y$ code bits result in a value of zero. Also, the set of codes are generated by finding codes from the OVSF codes in which a combination of $2^Y$ code bits result in a value of zero and which has point symmetry, if a pulse shaping function is symmetrical. Moreover, the generated set of codes are allocated by dividing the generated set of codes into $2^Y$ groups and selecting a group which causes the least interference to the signals of the first chip rate.

A transmitter for multiple chip rates in a mobile communication system according to the present invention comprises a first transmitting branch which spreads signals of a first chip rate with first channelization codes, scrambles the spread signals of the first chip rate with scrambling codes, and processes the scrambled signals of the first chip rate to generate a real number signal and an imaginary number signal of the first chip rate in chip waveform for transmission through a dedicated frequency band; a second transmitting branch which spreads signals of a second chip rate with second channelization codes, scrambles the spread signals of the second chip rate with said scrambling codes, and processes the scrambled signals of the second chip rate to generate a real number signal and an imaginary number signal of the second chip rate in chip waveform for transmission through a dedicated frequency band; a first mixer which loads the real number signal of the first chip rate from the first transmitting branch to the carrier wave by multiplying $\cos(\omega_1 t)$; a second mixer which loads the imaginary number signal of the first chip rate from the first transmitting branch to the carrier wave by multiplying $-\sin(\omega_1 t)$; a third mixer which loads the real number signal of the second chip rate from the second transmitting branch to the carrier wave by multiplying $\cos(\omega_2 t)$, where $\omega_1 \neq \omega_2$; and a fourth mixer which loads the imaginary number signal of the second chip rate from the second transmitting branch to the carrier wave by multiplying $-\sin(\omega_2 t)$, where $\omega_1 \neq \omega_2$.

Accordingly, the present invention introduces a method for allocating channelization code and scrambling code in multiple code rates and a method and an apparatus for transmitting signal through multiple chip rates minimizing interference. Particularly, the present invention is appropriate in an environment where various user signals having various chip rates exist in an overlaid carrier frequency band.

In accordance with the present invention, many users signals that have various chip rates in overlaid frequency band can be transmitted with minimum interference between users, by way of allocating orthogonal spreading code in which the sum of bits for a period that is determined by the ratio of chip rates is canceled respectively, as channelization codes.

BRIEF DESCRIPTION OF THE DRAWING

The invention will be described in detail with reference to the following drawings in which like reference numerals refer to line elements wherein.

DETAILED DESCRIPTION OF THE INVENTION

Figure 1:
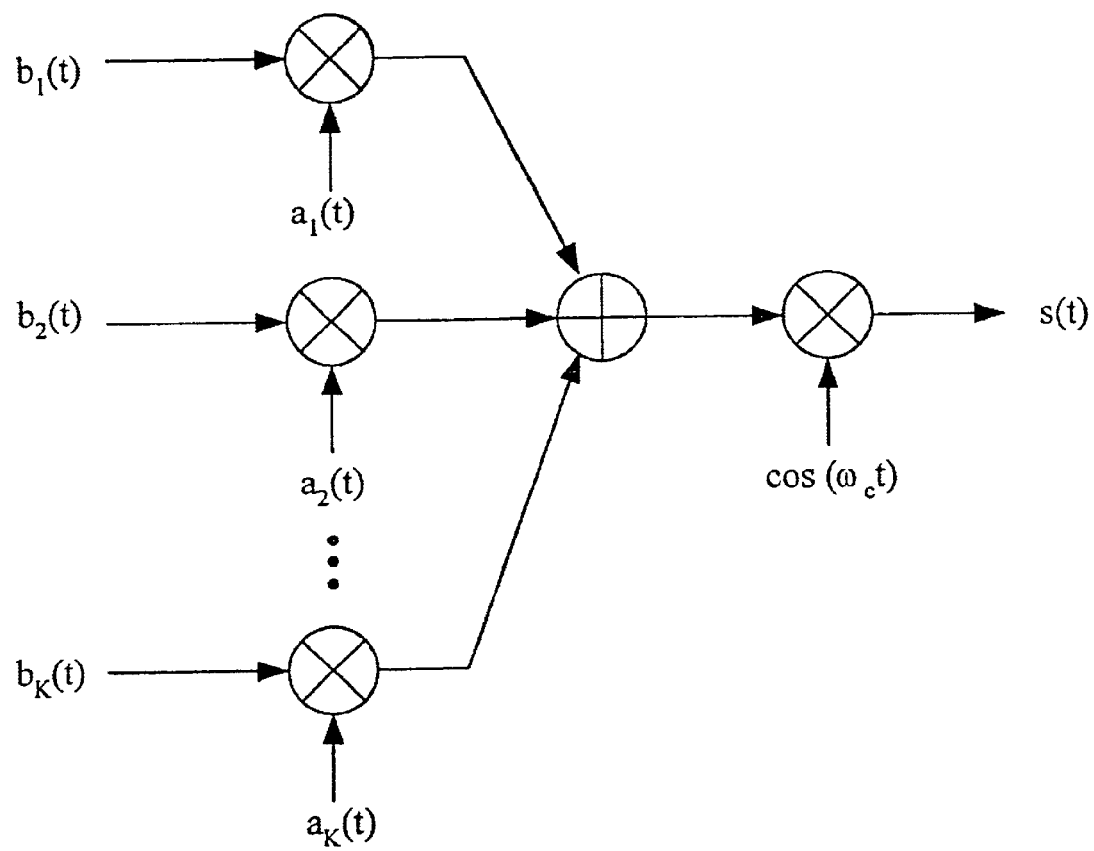
FIG. 1 shows a spreader mounted in a transmitter of a CDMA system in the related art.

Reference will now be made in detail to the preferred embodiments of the present invention, examples of which are illustrated in the accompanying drawings. Generally, the present invention allows transmission of signals in multiple code rates in mobile communication systems. Particularly, the present invention allocates channelization codes in multiple chip rates for transmitting signals in multiple chip rates.

In accordance with the present invention, a method of allocating channelization codes for multiple code rates is accomplished by allocating orthogonal spreading codes, in which the sum of channelization code bits for a period that is determined by the ratio of chip rates is minimized, respectively, as channelization codes of a system where the user signals having various chip rates exist. The signal of each user is time-synchronized to preserve orthogonality of channelization codes.

In the present invention, it is assumed that the signals of users may have different chip rates, but the chip rates are restricted as follows. If the lowest chip rate is to be $R_0$, other possible chip rates would be $R_0 * 2^y$ where y is a positive integer. The allocation procedure of OVSF codes to the user signal of chip rate $R_0$ is same as the allocation procedure in the related art. However, the allocation procedure of OVSF codes to the user signal of chip rates $R_0 * 2^y$ is performed by allocating a portion of the OVSF codes.

The method of present invention for allocating channelization codes regarding chip rate will be explained by applying a transmitter and a receiver in CDMA communication systems. The transmitter and the receiver of CDMA communication systems are of same structure as those explained with reference to FIGS. 1 and 2. The data signal $b_k(t)$ of user k is same as expressed by Equation 3, but the spreading signal $a_k(t)$ of user k is as follows.

$$a_k(t) = \sum_{j=-\infty}^{\infty} a_{k,j} \psi_k(t - jT_{c,k}), \quad \text{[Equation 8]}$$

where $a_{k,j}$ is the jth chip of the channelization code allocated to the kth user and has alternative value of 1 or −1, $T_{c,k}$ is the period of chip of kth user which is a reciprocal of the chip rate, and $\Psi_k(t)$ is the pulse shaping function of k-th user with duration $T_{c,k}$, i.e. $\Psi_k(t)$ has non-trivial value for $0 \leq t < T_{c,k}$ and $\Psi_k(t)=0$ otherwise. The period of chip can be expressed as $T_{c,k} = M_k T_f$, where $M_k = 1, 2, 4, \ldots T_f$ is the reciprocal of the highest chip rate in the systems.

Thus, the data signal $b_k(t)$ of user k is spread by multiplying spreading signal $a_k(t)$ and all spread signals are transmitted through a common channel. The signal transmitted through channel s(t) is equal to that expessed by Equation 1. The interference signal $I_{k,i}(nT_i)$ of the output signal $Z_i(nT_i)$ of receiver is as follows.

$$I_{k,i}(nT_i) = \frac{1}{T_i} \sum_{n=\alpha_{k,i}}^{\beta_{k,i}} b_{k,m} R_{k,i}(m), \quad \text{[Equation 9]}$$

where $$\alpha_{k,i} = \lfloor nT_i/T_k \rfloor$$

$$\beta_{k,i} = \begin{cases} \lfloor nT_i/T_k \rfloor, & T_i \leq T_k \\ \lfloor (n+1)T_i/T_k \rfloor - 1, & T_i > T_k \end{cases}$$

$$R_{k,i}(m) = \begin{cases} \sum_{r=nSF_iM_i}^{(n+1)SF_iM_i-1} \hat{a}_{k,r} \hat{a}_{i,r} \int_{T_f}^{(r+1)T_f} \psi_k(t - \lfloor r/M_k \rfloor \cdot T_{c,k}) \cdot \\ \psi_i(t - \lfloor r/M_i \rfloor \cdot T_{c,i}) dt, & T_i \leq T_k \\ \sum_{r=mSF_kM_k}^{(m+1)SF_kM_k-1} \hat{a}_{k,r} \hat{a}_{i,r} \int_{T_f}^{(r+1)T_f} \psi_k(t - \lfloor r/M_k \rfloor \cdot T_{c,k}) \cdot \\ \psi_i(-\lfloor r/M_i \rfloor \cdot T_{c,i}) dt, & T_i > T_k \end{cases}$$

$$\hat{a}_{k,r} = a_{k,\lfloor r/M_k \rfloor}$$

Accordingly, the value of $R_{k,j}(m)$ $(m = \alpha_{x,j}, \alpha_{x,j}+1, \ldots \beta_{x,j})$ should be zero in order to make the value of interference signal $I_{k,i}(nT_i)$ to be zero, regardless of data bit of interfering user signal $b_{k,m}$. Moreover, the pulse shaping function should be considered along with the conditions for channelization code $a_{k,r}$.

Figure 2:
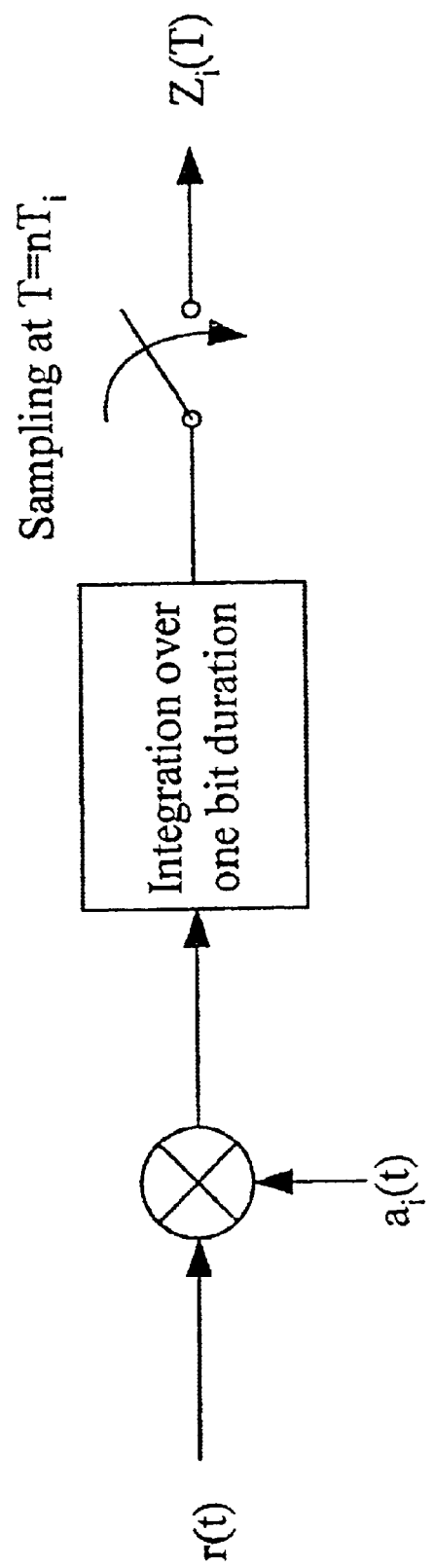
FIG. 2 shows a de-spreader mounted in a receiver of a CDMA system in the related art.

The pulse shaping function of FIGS. 1 and 2 has been considered to have the duration of $T_{c,k}$. However, a pulse shaping function may have a longer duration than $T_{c,k}$ and will be considered below. In addition, two cases for the pulse shaping function are considered, namely a rectangular pulse and a symmetrical pulse.

First, the method of allocating OVSF code when the chip pulse function is rectangular wave will be explained. If the pulse shaping function is rectangular pulse, it has a value of 1 for a range of $\Psi_k(t)$ where $t \in [0, T_{c,k}]$, and has a value of 0 for other range. Therefore, the $R_{k,j}(m)$ in Equation 9 can be expressed more simply by the following equation.

$$R_{k,i}(m) = \begin{cases} T_f \sum_{r=nSF_iM_j}^{(n+1)SF_iM_j-1} \hat{a}_{k,r}\hat{a}_{i,r}, & T_i \leq T_k \\ T_f \sum_{r=mSF_kM_R}^{(m+1)SF_kM_k-1} \hat{a}_{k,r}\hat{a}_{i,r}, & T_i > T_k \end{cases} \quad \text{[Equation 10]}$$

Equation 10 above shows the cross-correlation value of two codes $a_{k,r}$ and $a_{i,r}$.

If a signal which has a shorter chip duration than the chip rate is $a_{i,r}$ and a signal which has a longer chip duration is $a_{k,r}$, the relationship between the chip period $(T_{c,k})$ of the code $a_{k,r}$ and the chip period $(T_{c,j})$ of the code $a_{i,r}$ can be established as follows.

$$P_{k,i} = T_{c,k}/T_{c,i} = M_k/M_i \quad \text{[Equation 11]}$$

At this time, for a duration of $T_{c,k}$, the value of code $a_{i,r}$ is changed $P_{k,j}$ times while the value of code $a_{k,r}$ is changed once. Therefore, $R_{k,j}(m)$ in Equ. 10 can be converted as follows.

$$R_{k,i}(m) = \begin{cases} T_f \sum_{r=nSF_i/P_{k,j}}^{(n+1)SF_i/P_{k,j}-1} \left( a_{k,r} \sum_{s=rP_{k,j}}^{(r+1)P_{k,j}-1} a_{i,s} \right), & T_i \leq T_k \\ T_f \sum_{r=mSF_k}^{(m+1)SF_4-1} \left( a_{k,r} \sum_{s=rP_{k,j}}^{(r+1)P_{k,j}-1} a_{i,s} \right), & T_i > T_k \end{cases} \quad \text{[Equation 12]}$$

The condition that the value of Equation 12 equals to zero for arbitrary $a_{k,r}$ is the condition that the sum of codes while the code $a_{i,r}$ changes $P_{k,j}$ times is zero. Therefore, for the index i of all other users who use higher chip rate than that of user k, the following equation must be satisfied.

$$\sum_{s=rP_{k,j}}^{(r+1)P_{k,j}-1} a_{i,s} = 0, \quad r = 0, 1, \ldots, SF_i/P_{k,i} - 1 \quad \text{[Equation 13]}$$

Figure 3:
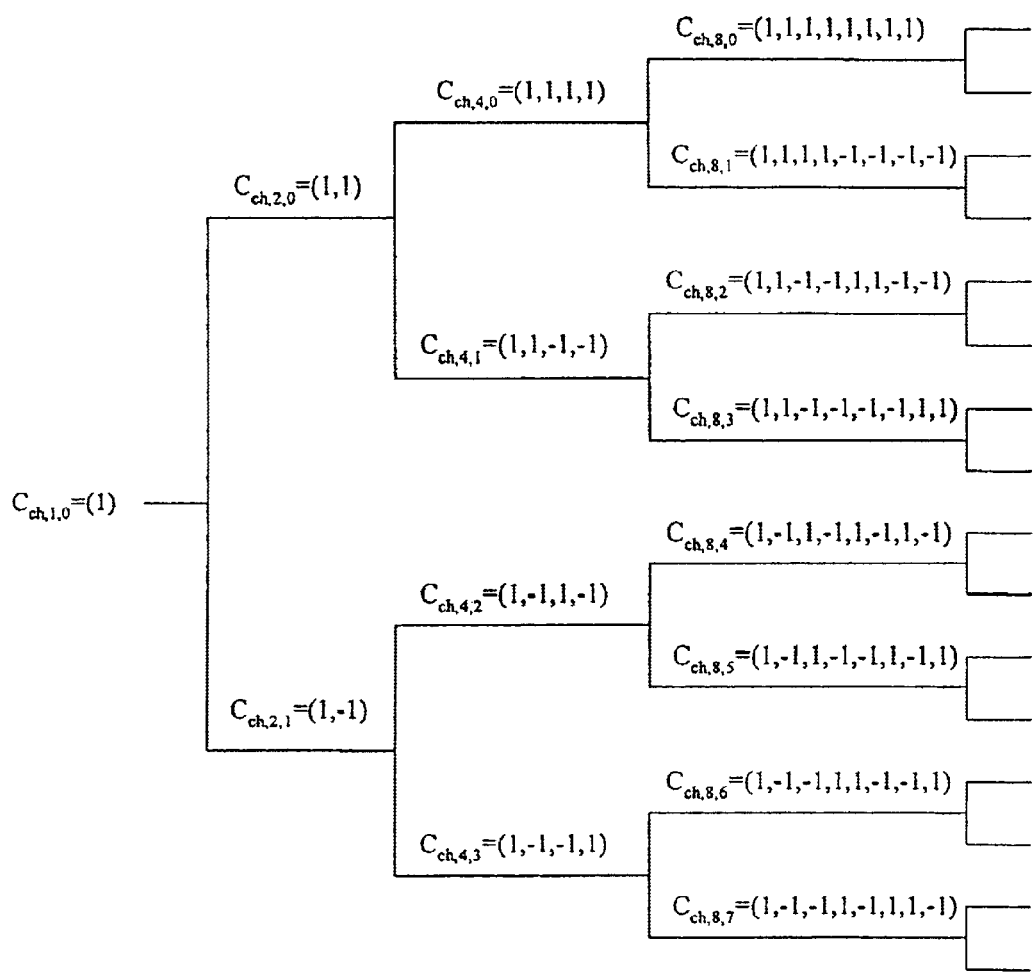
FIG. 3 shows a code tree for generation of OVSF codes in the related art.
Figure 4:
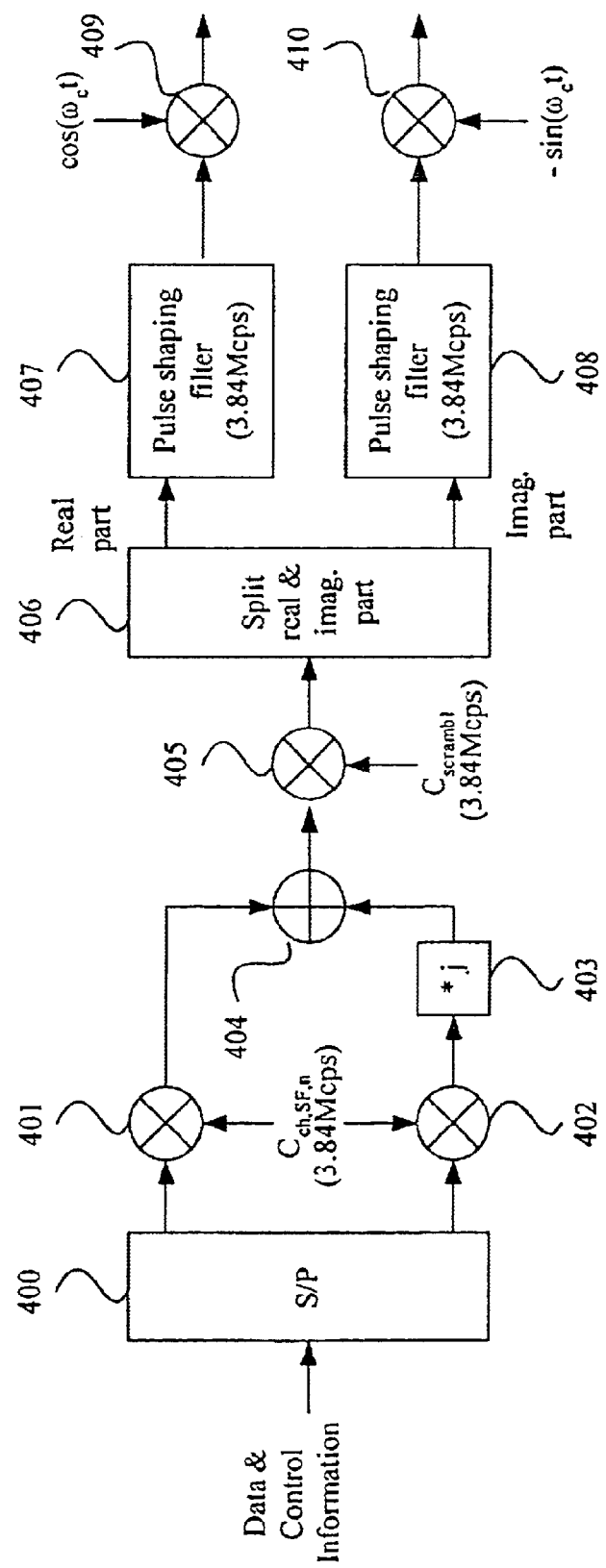
FIG. 4 shows a block diagram of a transmitter for single chip rate of a wide-band CDMA system in the related art.
Figure 6:
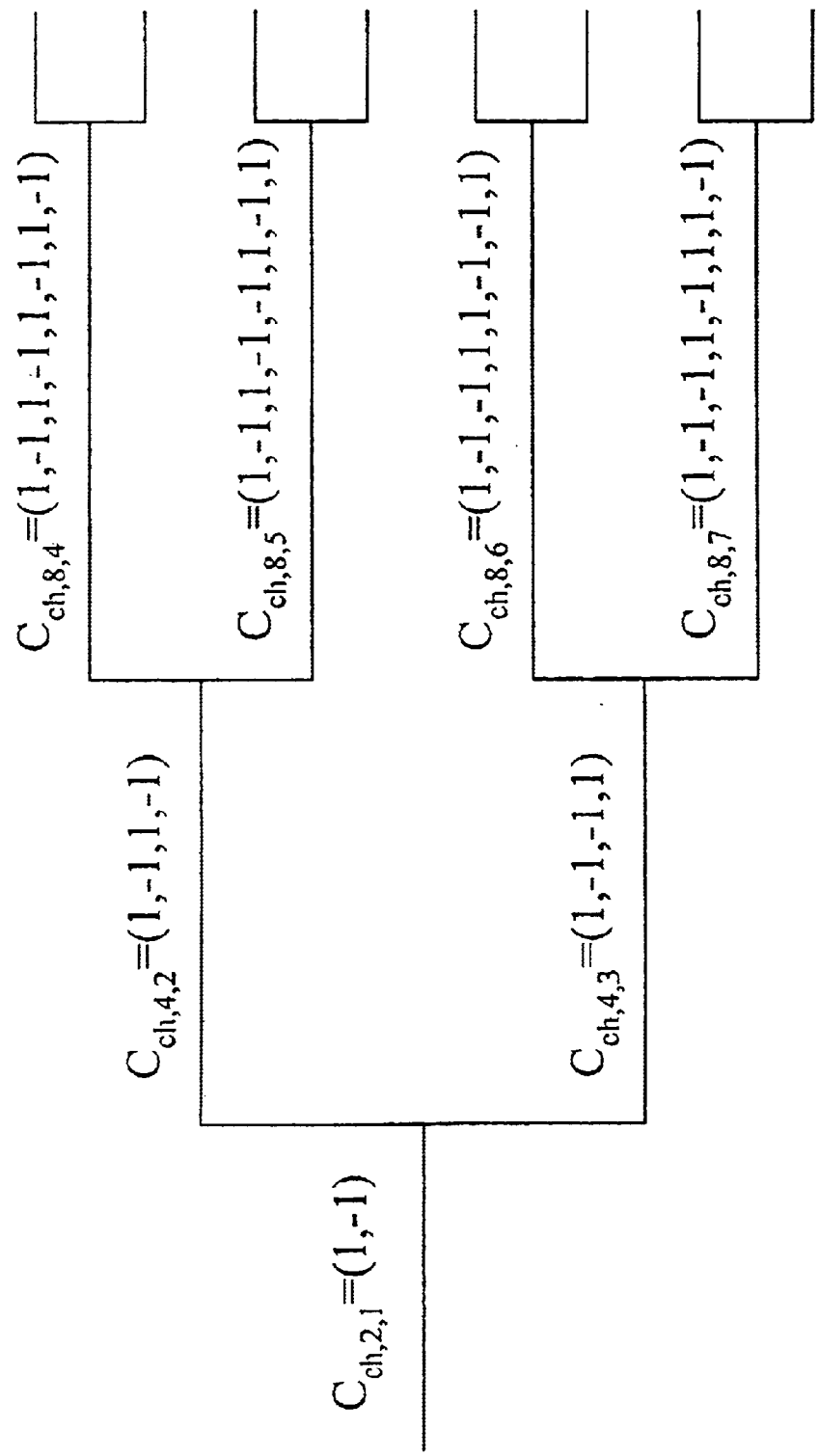
FIG. 6 shows an example of OVSF code which can be allocated to user signal having double the chip rate of reference chip rate according to the present invention.

The channelization allocating method for two chip rates, $R_0$ and $2*R_0$ will be considered. For the signal with chip rate $R_0$, any OVSF code can be used as described with reference to FIG. 3 as in the conventional procedure. However, for the signal of chip rate $2*R_0$, the OVSF codes as shown in FIG. 6 is generated from the OVSF codes shown in FIG. 3 and one of the generated OVSF is allocated. The generated codes will be called Quasi-Orthogonal Multiple Chip Rate (QOMCR).

The QOMCR codes of FIG. 6 are read as follows. First, find a code which becomes zero after combining two code bits because the chip rate of $2*R_0$ is doubled from the chip rate of $R_0$. Then, find codes such as $C_{ch,2,1}=(1, -1)$, $C_{ch,4,2}=(1, -1, 1, -1)$, $C_{ch,4,3}=(1, -1, -1, 1)$ which are $C_{ch,2,1}$ and descendents of $C_{ch,2,1}$.

The channelization allocating method for two chip rates, $R_0$ and $4*R_0$, will next be considered. For the signal with chip rate $R_0$, any OVSF code can be used as in the conventional procedure. For the signal of chip rate $4*R_0$, find a code which becomes zero after combining four code bits because the chip rate of $4*R_0$ is four time of the chip rate $R_0$. The OVSF codes that satisfy the above conditions are $C_{ch,2,1}$ and $C_{ch,4,1}$, and the descendents of $C_{ch,2,1}$ and $C_{ch,4,1}$.

The OVSF code of signals which have higher chip rate than $4*R_0$ can be generated in an analogous procedure as $2*R_0$ and $4*R_0$.

Thereafter, the procedure of allocating the QOMCR codes generated as described above is same as the conventional procedure. That is, in the code tree, all descendant codes and ancestor codes of the code allocated to the other users with the same chip rate, and the codes allocated to the other users with the same chip rate are not used in the signals of same chip rate. However, the code allocation is not affected by different chip rate code allocation. This means that the same OVSF codes can be allocated to multiple users if their chip rates are not the same.

The method of generating and allocating OVSF code when the pulse shaping function is symmetrical function is next considered. The symmetrical function is the function which is symmetrical to the center of pulse, i.e. $\Psi_k(t-T_{c,k}/2-d)=\Psi_k(t-T_{c,k}/2+d)$, where $\Psi_k(t)=0$ for $t<0$ or $t\geq T_{c,k}$. The condition which makes $R_{k,j}(m)$ of Equation 9 zero is when the following is satisfied.

$$\sum_{r=dP_{k,i}}^{(d+1)P_{k,i}-1} a_{i,r} \int_{T_{0,i}}^{(r+1)T_{c,i}} \psi_k(t - \lfloor r/M_k \rfloor \cdot P_{k,i}) \cdot$$

$$\psi_i(t - r \cdot T_{c,i}) dt = 0 \quad d = 0, 1, \ldots, N_i/P_{k,i} - 1 \quad \text{[Equation 14]}$$

To satisfy Equation 14, the Equations 15 and 16 should be satisfied.

$$\sum_{r=dP_{k,i}}^{(d+1)P_{k,i}-1} a_{i,r} = 0, \quad d = 0, 1, \ldots, N_i/P_{k,i} - 1 \quad \text{[Equation 15]}$$

$$a_{i,dP_{k,i}+P_{k,i}/2-e} = -a_{i,dP_{k,i}+P_{k,i}/2-1+e} \quad \text{[Equation 16]}$$

where $d=0,1,\ldots,N_i/P_{k,i}-1$, $e=1,2,\ldots P_{k,i}/2$.

That is, if the pulse shaping function is a symmetrical function, find and allocate OVSF codes which satisfy both Equations 15 and 16.

Particularly, the channelization allocating method for two chip rates, $R_0$ and $2*R_0$, is as follows. For the signal with chip rate $R_0$, any OVSF code can be used like the conventional procedure. However, for the signal of chip rate $2*R_0$, find and allocate OVSF code which has point symmetry and two chip bits which combine to a value of zero. The codes that satisfy the above conditions are $C_{ch,2,1}$ and the descendant codes of $C_{ch,2,1}$.

Also, in the channelization allocating method for two chip rates, $R_0$ and $4*R_0$, any OVSF code can be used like the conventional procedure for the signal with chip rate $R_0$. For the signal of chip rate $4*R_0$, find and allocate OVSF code which has point symmetry and four chip bits which combine to a value of zero. The codes that satisfy the above conditions are codes such as $C_{ch,4,1}=(1, 1, -1, -1)$, $C_{ch,4,2}=(1, -1, 1, -1)$, $C_{ch,8,2}=(1, 1, -1, -1, 1, 1, -1, -1)$, $C_{ch,8,3}=(1, 1, -1, -1, -1, -1, 1, 1)$, $C_{ch,8,4}=(1, -1, 1, -1, 1, -1, 1, -1)$, and $C_{ch,8,5}=(1, -1, 1, -1, -1, 1, -1, 1)$ which are $C_{ch,4,1}$, $C_{ch,4,2}$, and the descendents of $C_{ch,4,1}$ and $C_{ch,4,2}$.

The OVSF code of signals which have higher chip rate than $4*R_0$ can be generated in an analogous procedure as $2*R_0$ and $4*R_0$.

Figure 7:
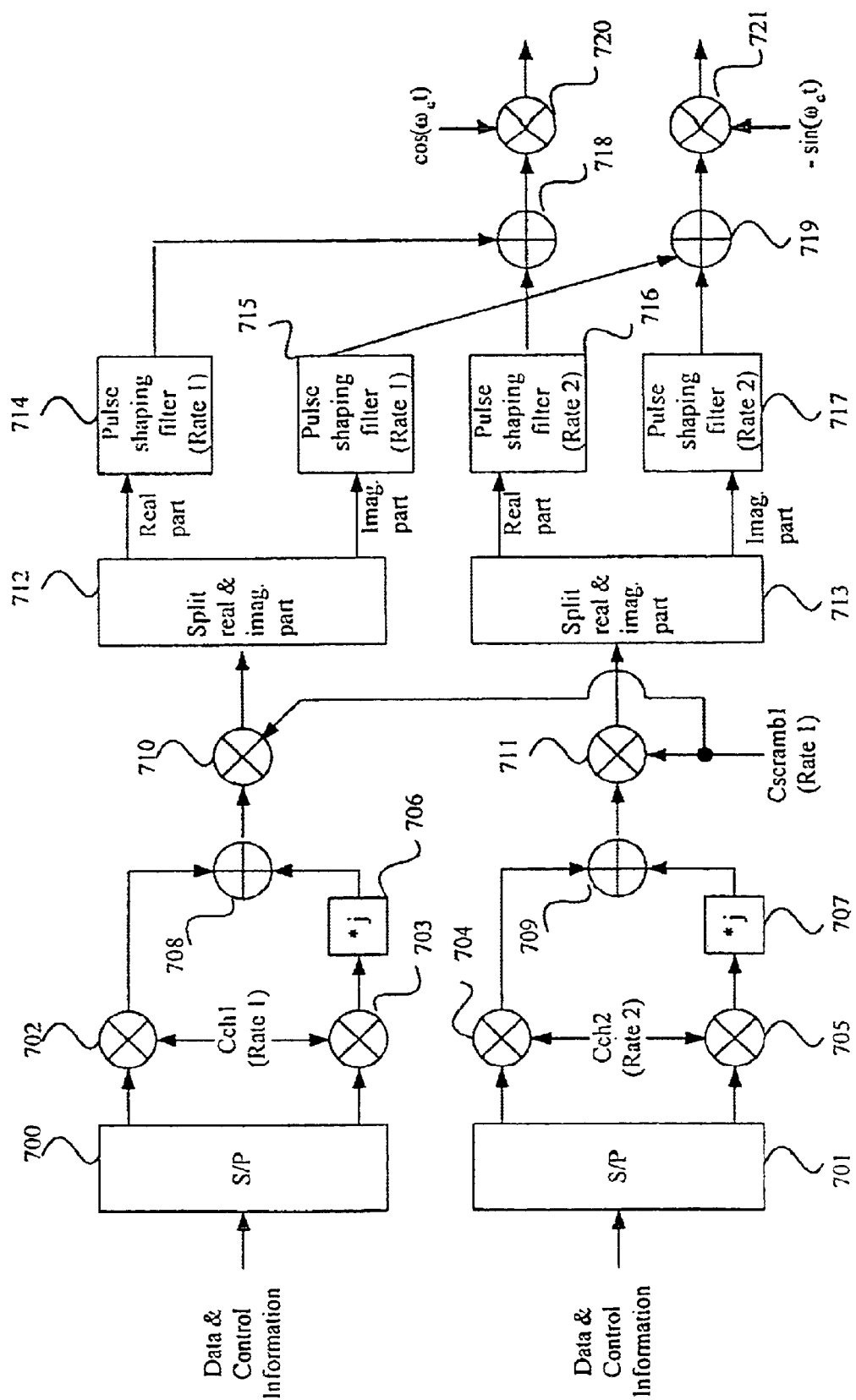
FIG. 7 shows a block diagram of a first embodiment of a transmitter of present invention for multiple chip rate wide-band CDMA system.

The present invention will next be applied to the Wideband CDMA mobile radio system which is one of IMT-2000 system. In order to support multiple chip rates in Wideband CDMA system, a transmitting device according to the present invention is shown in FIG. 7. Here, the second chip rate is double the first chip rate and the carrier frequency of the signal of the first or second chip rate is the same. For example, the first chip rate and the second chip rate may be one of 3.84 Mcps, 7.68 Mcps, 15.36 Mcps used in a WCDMA communication system. Furthermore, the system of FIG. 7 reduces interference between different chip rates by scrambling the signals of various chip rates with the complex scrambling code of the signal which has the lowest chip rate and by using QOMCR codes as channelization codes of higher chip rate.

Referring to FIG. 7, the transmitting device of present invention generally comprises of a first transmitting branch for transmitting signal of first chip rate and a second transmitting branch for transmitting signal of second chip rate.

The first transmitting branch is comprises a first serial to parallel (S/P) converter (700) which outputs I signal and Q signal from data or control information of first chip rate; a first mixer (702) and a second mixer (703) which spread data symbol to chip by multiplying I signal and Q signal output from said first S/P converter (700) with the first channelization code of the first chip rate; a first imaginary number converter (706) which converts the output of said second mixer (703) into an imaginary number; a first combining means (708) which outputs complex number signal by combining I signal from said first mixer (702) and Q signal from said first imaginary number converter (706); a third mixer (710) which scrambles the complex number signal output from said first combining means (708) by multiplying scrambling code; a first real and imaginary number separating unit (712) which separates the scrambled complex number signal into real component and imaginary component, and outputs the separated signals; and a first pulse shaping filter (714) and second pulse shaping filter (715) which generate chip waveform in order to transmit the separated output signal through a dedicated frequency band.

The second transmitting branch comprises a second S/P converter (701) which outputs I signal and Q signal from data or control information of second chip rate; a fourth mixer (704) and a fifth mixer (705) which spread data symbol to chip by multiplying I signal and Q signal output from said second S/P converter (701) with the second channelization code of the second chip rate; a second imaginary number converter (707) which converts the output of said fifth mixer (707) into an imaginary number; a second combining unit (709) which outputs complex number signal by combining I signal from said fourth mixer (704) and Q signal from said second imaginary number converter (707); a sixth mixer (711) which scrambles the complex number signal output from said second combining means (709) by multiplying scrambling code; a second real and imaginary number separating unit (713) which separates the scrambled complex number signal into real component and imaginary component, and outputs the separated signals; and third pulse shaping filter (716) and fourth pulse shaping filter (717) which generate chip waveform in order to transmit the separated output signal through a dedicated frequency band.

The transmitting device of present invention further includes a third combining unit (718) which combines real number component signal output from first pulse shaping filter (714) of said first branch and real number component signal output from third pulse shaping filter (716) of said second branch; a fourth combining unit (719) which combines imaginary number component signal output from second pulse shaping filter (715) of said first branch and imaginary number component signal output from fourth pulse shaping filter (717) of said second branch; a seventh mixer (720) which loads the output real number signal of said third combining unit (718) to the carrier wave by multiplying $\cos(\omega_c t)$; and an eighth mixer (721) which loads the output imaginary number signal of said fourth combining unit (719) to the carrier wave by multiplying $-\sin(\omega_c t)$.

The operation of the transmitting device according to the present invention is as follows. First, the transmitting device of present invention is characterized by using the same scrambling code for signals of different chip rates and using QOMCR code as channelization code for the signals of higher chip rates. Namely, if the first chip rate is lower than the second chip rate, OVSF code is allocated through conventional procedure for the signal of first chip rate and QOMCR code is allocated for the signal of second chip rate. The signals of both chip rates are then scrambled with the complex number scrambling code of the signal of first chip rate.

Where the QOMCR code can be generated using part of the OVSF code, the code tree for generating the OVSF code may be used for the QOMCR code. As shown in FIG. 6, the lower half of the code tree for generating the OVSF code becomes the code tree for generating the QOMCR code. The allocating procedure of the QOMCR code from the code tree is similar to the procedure for the OVSF code. Particularly, in the code tree shown in FIG. 6, select the QOMCR code except the code which is used by other user signal and its descendant and ancestor codes. However, the channelization code allocated to the channel of second chip rate may be allocated repeatedly to the channel of first chip rate, and vice versa.

Thus, the first mixer (702) and the second mixer (703) in FIG. 7 spread the signal of the first chip rate using OVSF code, and the fourth mixer (704) and the fifth mixer (705) spread the signal of second chip rate using QOMCR code. The third mixer (710) and sixth mixer (711) respectively scramble the signals of first chip rate and second chip rate using the complex number scrambling code of first chip rate. Thereafter, the third combining unit (718) and fourth combining unit (719) respectively combine each real number signal and imaginary number signal of each chip rate for modulating and transmitting over carrier frequency $\omega_c$.

Therefore, the present invention as described above minimizes the interference between the signals with different chip rates. The interference between the signals with the same chip rate is zero due to the orthogonality of OVSF codes. If the duration of pulse shaping function is equal to the chip duration, the interference between the signals with different chip rates would also be zero.

However, in WCDMA communication systems, the duration of pulse shaping function, which is root-raised cosine function, is not restricted to the chip duration. The duration of pulse shaping function is time restricted in the range of several ten times of the chip range. In consideration of these pulse shaping function, the interference between channels of first chip rate and second chip rate is as follows in Table 1 and Table 2.

Figure 5:
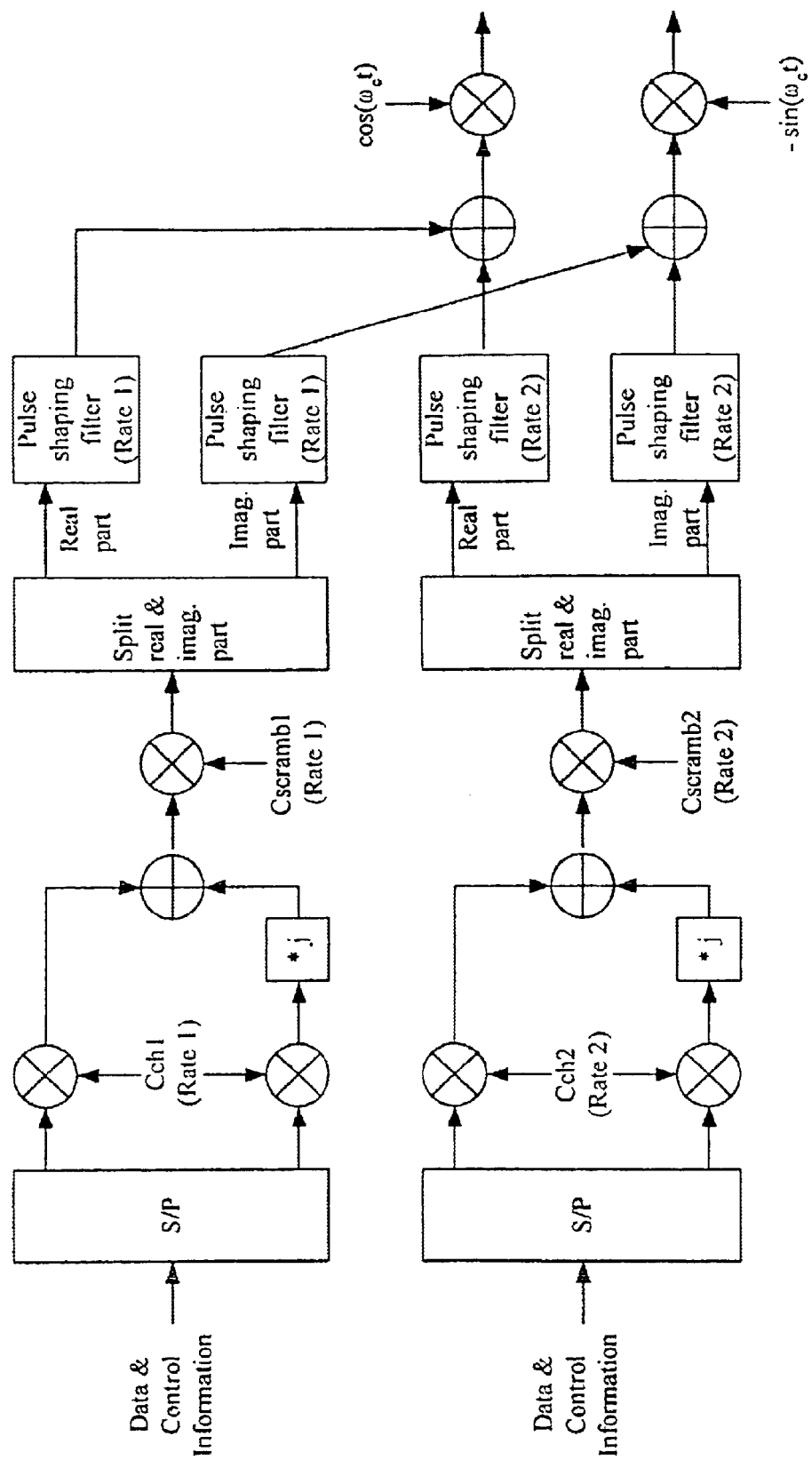
FIG. 5 shows a block diagram of a extended version of transmitter for multiple chip rate of a wide-band CDMA system in the related art.

In Tables 1 and 2, the conventional system refers to the transmitting device shown in FIG. 5. In such system, the first chip rate signal is scrambled by the scrambling code with the first chip rate, and the second chip rate signal is scrambled by the scrambling code with the second chip rate. This means that the scrambling codes of first and second chip rate have different chip rates. However, in the present invention, the same scrambling code having the same chip rate and same scrambling code sequence pattern are used for both first and second chip rates. The scrambling codes of the first chip rate, which is lower than the second chip rate, are used for both first and second chip rate signals.

Table 1 shows an example of interference energy which the OVSF code of second chip rate $C_{ch,SF2,n2}$ reacts on the OVSF code of first chip rate $C_{ch,SF1,n1}$.

TABLE 1

| $C_{ch,SF2,n2}$ | | | $C_{ch,SF1,n1}$ | | | Interference energy | |
|---|---|---|---|---|---|---|---|
| | | | | | | Conventional | Present |
| Rate | SF2 | n2 | Rate | SF1 | n1 | System | System |
| 2 | 4 | 0 | 1 | 4 | 0 | 0.250469 | 0.41412400 |
| 2 | 4 | 1 | 1 | 4 | 0 | 0.252803 | 0.40798000 |
| 2 | 4 | 2 | 1 | 4 | 0 | 0.260453 | 0.09769900 |
| 2 | 4 | 3 | 1 | 4 | 0 | 0.256097 | 0.09622900 |
| 2 | 4 | 0 | 1 | 4 | 1 | 0.261302 | 0.41539600 |
| 2 | 4 | 1 | 1 | 4 | 1 | 0.258018 | 0.41759300 |
| 2 | 4 | 2 | 1 | 4 | 1 | 0.264181 | 0.09315760 |
| 2 | 4 | 3 | 1 | 4 | 1 | 0.258970 | 0.09175750 |
| 2 | 4 | 0 | 1 | 4 | 2 | 0.253306 | 0.41332600 |
| 2 | 4 | 1 | 1 | 4 | 2 | 0.258465 | 0.42244600 |
| 2 | 4 | 2 | 1 | 4 | 2 | 0.244491 | 0.09334380 |
| 2 | 4 | 3 | 1 | 4 | 2 | 0.259437 | 0.09202720 |
| 2 | 4 | 0 | 1 | 4 | 3 | 0.252720 | 0.41805800 |
| 2 | 4 | 1 | 1 | 4 | 3 | 0.258872 | 0.41627500 |
| 2 | 4 | 2 | 1 | 4 | 3 | 0.254083 | 0.09299040 |
| 2 | 4 | 3 | 1 | 4 | 3 | 0.258779 | 0.09465040 |

In the above Table 1, the values are normalized energy values where the energy of desired signal is adjusted to 1. Referring to Table 1, the OVSF codes of second chip rate $C_{ch,4,2}$ and $C_{ch,4,3}$ (codes which belong to the QOMRC codes in FIG. 6) exerts less interference to the OVSF code of first chip rate than the OVSF codes of second chip rate $C_{ch,4,0}$ and $C_{Cch,4,1}$ (codes which does not belong the QOMRC codes). This is also true in other spread factors. That is, among OVSF codes of number SF of which the spread factor of second chip rate is SF, the OVSF codes $C_{ch,SF,SF/2}$, $C_{ch,SF,SF/2+1}$, ..., $C_{ch,SF,SF-1}$ exert little interference to the OVSF code of first chip rate, where said OVSF codes $C_{ch,SF,SF/2}$, $C_{ch,SF,SF/2+1}$, ..., $C_{ch,SF,SF-1}$ are QOMCR codes.

Table 2 shows an example of interference energy which the OVSF code of first chip rate $C_{ch,SF1,n1}$ reacts on the OVSF code of second chip rate $C_{ch,SF2,n2}$.

TABLE 2

| $C_{ch,SF1,n1}$ | | | $C_{ch,SF2,n2}$ | | | Interference energy | |
|---|---|---|---|---|---|---|---|
| | | | | | | Conventional | Present |
| Rate | SF1 | n1 | Rate | SF2 | n2 | System | System |
| 1 | 4 | 0 | 2 | 4 | 0 | 0.132829 | 0.228301 |
| 1 | 4 | 1 | 2 | 4 | 0 | 0.137736 | 0.226355 |
| 1 | 4 | 2 | 2 | 4 | 0 | 0.138579 | 0.223733 |
| 1 | 4 | 3 | 2 | 4 | 0 | 0.136652 | 0.227353 |
| 1 | 4 | 0 | 2 | 4 | 1 | 0.139106 | 0.216309 |
| 1 | 4 | 1 | 2 | 4 | 1 | 0.137099 | 0.227116 |
| 1 | 4 | 2 | 2 | 4 | 1 | 0.138783 | 0.224611 |
| 1 | 4 | 3 | 2 | 4 | 1 | 0.144436 | 0.228437 |
| 1 | 4 | 0 | 2 | 4 | 2 | 0.137828 | 0.053275 |
| 1 | 4 | 1 | 2 | 4 | 2 | 0.140154 | 0.051454 |
| 1 | 4 | 2 | 2 | 4 | 2 | 0.141154 | 0.049226 |
| 1 | 4 | 3 | 2 | 4 | 2 | 0.139216 | 0.047343 |
| 1 | 4 | 0 | 2 | 4 | 3 | 0.141053 | 0.049632 |
| 1 | 4 | 1 | 2 | 4 | 3 | 0.137739 | 0.053186 |
| 1 | 4 | 2 | 2 | 4 | 3 | 0.136752 | 0.050658 |

TABLE 2-continued

| $C_{ch,SF1,n1}$ | | | $C_{ch,SF2,n2}$ | | | Interference energy | |
|---|---|---|---|---|---|---|---|
| | | | | | | Conventional | Present |
| Rate | SF1 | n1 | Rate | SF2 | n2 | System | System |
| 1 | 4 | 3 | 2 | 4 | 3 | 0.143608 | 0.050057 |

Referring to Table 2 above, among the OVSF codes of the second chip rate, the interference energy which OVSF codes which belong to the QOMRC codes received from arbitrary OVSF code of first chip rate is less than that of other OVSF codes which does not belong to the QOMRC codes of second chip rate.

Accordingly, in consideration of the pulse shaping filter of WCDMA system and in order to further reduce interference between channels of different chip rates, the present invention comprises spreading signal using OVSF code as channelization code of first chip rate, optimizing and using QOMCR code as channelization code of the second chip rate, and using a same complex number scrambling code for scrambling signals of both first chip rate and second chip rate. Here, the complex number scrambling code of first chip rate is used as complex number scrambling code of second chip rate.

An optimization of the QOMCR codes when the carrier frequencies of the first and second chip rates are equivalent will be first discussed. FIG. 7 shows a block diagram of a transmitter as described above for multiple chip rates WCDMA system, where the carrier frequency of the first chip rate is not the same with that of the second chip rate.

When the second chip rate is twice the first chip rate, the OVSF code $C_{ch,sf1,n1}$ (n1=0, 1, . . . sf1−1) is used as the channelization code of the first chip rate. For the second chip rate, the OVSF code is divided into two groups of $C_{ch,sf2,n2}$ (n2=0,1, . . . , sf2/2−1) and a second group of $C_{ch,sf2,n2}$ (n2=sf2/2, sf2/2+1, . . . , sf2−1) for a given spreading factor sf2. Thereafter, the second group of OVSF code is given priority and is used as the channelization code of the second chip rate.

The channelization code allocation method for multiple chip rate signals, where the second chip rate is four times of the first chip rate and carrier frequency of the signal of the first and second chip rate is same, will next be considered. In this case, the OVSF code $C_{ch,sf1,n1}$(n1=0, 1, . . . , sf1−1) is used for the channelization code of first chip rate and for the channelization code of second chip rate, the OVSF code $C_{ch,sf2,n2}$ is used divided by four groups and under the selection rule explained below.

Figure 8:
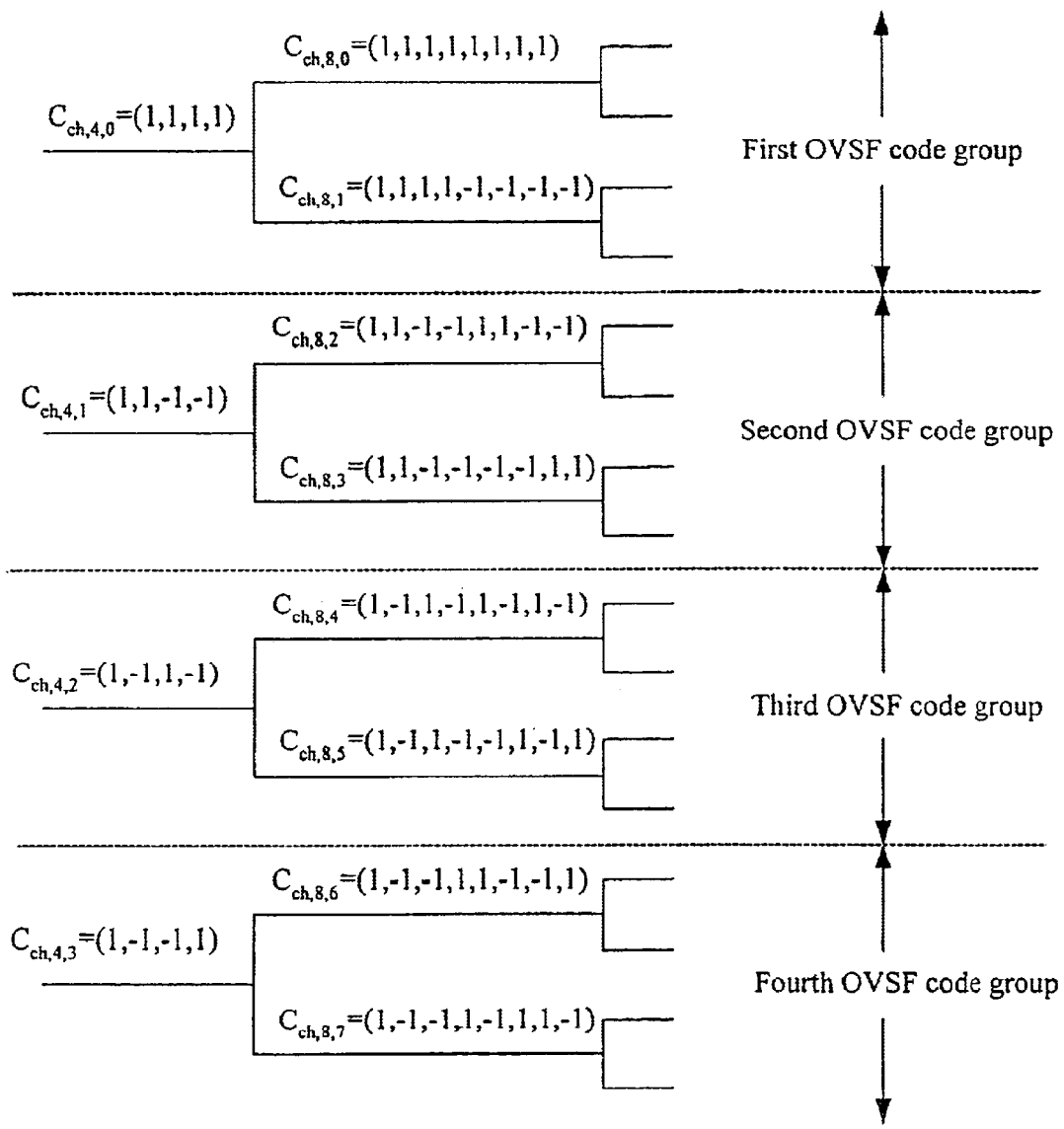
FIG. 8 shows an example of OVSF code groups which can be allocated as a channelization code of second chip rate, where the second chip rate is four times of the first chip rate.

First, the method of dividing the OVSF code into four groups is explained with reference to FIG. 8. For the given spreading factor sf2, the first group is $C_{ch,sf2,n2}$ (n2=0, 1, . . . , sf2/4−1), the second group is $C_{ch,sf2,n2}$ (n2=sf2/4, sf2/4+1, . . . , sf2/2−1), the third group is $C_{ch,sf2,n2}$ (n2=sf2/2, sf2/2+1, . . . , 3*sf2/4−1), and the fourth group is $C_{ch,sf2,n2}$ (n2=3*sf2/4, 3*sf2/4+1, . . . , sf2−1). The selection rule for using these four groups of OVSF code as the channel code is as follows.

A code in the fourth group of OVSF codes is used as a channelization code of second chip rate. If all codes in the fourth group of OVSF codes are used and if more OVSF codes are needed for channelization code of second chip rate, the channelization codes are allocated as follows:

If the spreading factor of second chip rate is not more than 256, a code in the third group of OVSF codes is used as a channelization code of second chip rate and if they are all used, a code in the second group of OVSF codes is used as a channelization code of second chip rate. On the other hand, if the spreading factor of second chip rate is more than 256, a code in one of the second group or the third group of OVSF codes is used as a channelization code of second chip rate and if they are all used, a code in the other group of OVSF codes is used as a channelization code of second chip rate.

Regarding the priority of the two groups, the second group is prior to the third if the interference of signals of first chip rate to signals of second chip rate is more of a critical factor than the interference of signals of second chip rate to signals of first chip rate. Otherwise, the third group is prior to the second.

The above allocation method for second chip rate signal is based on the result of computer simulation which is listed in Table 3. The spreading factor and OVSF index of the signals of second chip rate are denoted in the first and second columns in Table 3, respectively. Interference Interf1 at the second chip rate signal with $C_{ch,SF2,N2}$ due to the first chip rate signal with $C_{ch,4,N1}$ (N1=0, 1, 2, 3) is listed in the third column in Table 3, and Interference Interf2 at the first chip rate signal with $C_{ch,4,N1}$ (N1=0,1,2,3) due to the second chip rate signal with $C_{ch,SF2,N2}$ is listed in the fourth column in Table 3. The ratio of interference at Table. 3 is the division of the interference of present invention method by that of a method in the related art, for given spreading factor and index of OVSF code of first and second chip rate.

Thus, the fact that this ratio is less than 1 indicates the improvement of the present invention method because the method of present results in lower interference than that of the method in the related art. In this case, the spreading factor of the first chip rate signal is 4, but the tendency would be maintained for other spreading factors. Here, the system in the related art refers to the transmitting device shown in FIG. 5. In such system of the related art, the first chip rate signal is scrambled by the scrambling code with the first chip rate and the second chip rate signal is scrambled by the scrambling code with the second chip rate. This means that the scrambling codes of first and second chip rate have different chip rates.

In the present invention, the same scrambling code, i.e. same chip rate and same scrambling code sequence pattern, are used for both first and second chip rates. The scrambling codes of the first chip rate, which is lower than the second chip rate, are used for both first and second chip rate signals.

TABLE 3

| SF2 | N2 | Interf1 | Interf2 |
|---|---|---|---|
| 4 | 0 | 3.30 | 3.23 |
| 4 | 1 | 0.50 | 0.52 |
| 4 | 2 | 0.11 | 0.13 |
| 4 | 3 | 0.10 | 0.12 |
| 8 | 0, 1 | 3.32 | 3.24 |
| 8 | 2, 3 | 0.50 | 0.52 |
| 8 | 4, 5 | 0.12 | 0.13 |
| 8 | 6, 7 | 0.10 | 0.12 |
| 16 | 0~3 | 3.29 | 3.24 |
| 16 | 4~7 | 0.49 | 0.52 |
| 16 | 8~11 | 0.13 | 0.13 |
| 16 | 12~15 | 0.10 | 0.12 |
| 32 | 0~7 | 3.32 | 3.24 |
| 32 | 8~15 | 0.50 | 0.52 |
| 32 | 16~23 | 0.15 | 0.13 |
| 32 | 24~31 | 0.11 | 0.12 |
| 64 | 0~15 | 3.27 | 3.30 |
| 64 | 16~31 | 0.50 | 0.51 |
| 64 | 32~47 | 0.18 | 0.11 |
| 64 | 48~63 | 0.12 | 0.098 |

TABLE 3-continued

| SF2 | N2 | Interf1 | Interf2 |
|---|---|---|---|
| 128 | 0~31 | 3.15 | 3.30 |
| 128 | 32~63 | 0.49 | 0.51 |
| 128 | 64~95 | 0.26 | 0.11 |
| 128 | 96~127 | 0.14 | 0.097 |
| 256 | 0~63 | 2.94 | 3.30 |
| 256 | 64~127 | 0.47 | 0.51 |
| 256 | 128~191 | 0.38 | 0.11 |
| 256 | 192~255 | 0.18 | 0.094 |
| 512 | 0~127 | 2.67 | 3.30 |
| 512 | 128~255 | 0.48 | 0.51 |
| 512 | 256~383 | 0.59 | 0.11 |
| 512 | 384~511 | 0.24 | 0.097 |
| 1024 | 0~255 | 3.02 | 3.30 |
| 1024 | 256~511 | 0.53 | 0.51 |
| 1024 | 512~767 | 0.92 | 0.11 |
| 1024 | 768~1023 | 0.15 | 0.097 |
| 2048 | 0~511 | 2.98 | 3.30 |
| 2048 | 512~1023 | 0.53 | 0.51 |
| 2048 | 1024~1535 | 0.92 | 0.11 |
| 2048 | 1536~2047 | 0.15 | 0.096 |

In this system, the scrambling code of lower chip rate is also commonly used as the scrambling code for the two chip rate signals, and the OVSF code is used as the channelization code for signal of lower chip rate. As the channel code for signal of higher chip rate, the OVSF code which is selected with priority from a group of OVSF codes is used. The OVSF codes are grouped by dividing the original OVSF codes into the same number as the ratio of higher chip rate to lower chip rate. In this way, data signals of multiple chip rate can be transmitted by one transmitter with low interference between signals.

Up to now, the case in which the carrier frequencies of first chip rate and second chip rate are the same has been considered. The case when the carrier frequencies of first chip rate and second chip rate are not the same will next be considered. Generally, the concept of the present invention can be applied equally to both cases when the carrier frequencies of first chip rate and second chip rate are same or different, unless the carrier frequency separation between the different chip rate is relatively small.

Figure 9:
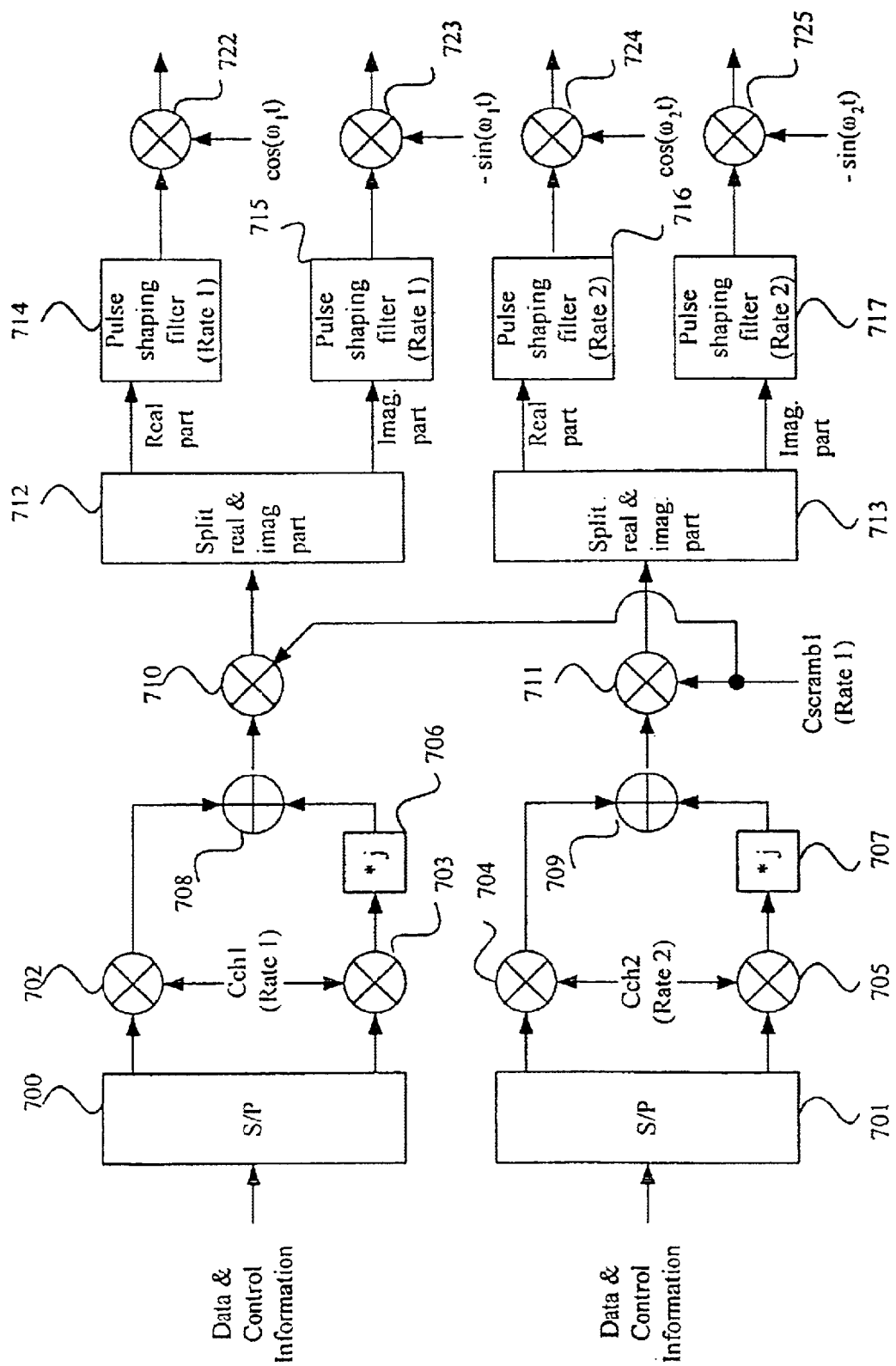
FIG. 9 shows a block diagram of a second embodiment of a transmitter of present invention for multiple chip rate wide-band CDMA system.

FIG. 9 shows a block diagram of a transmitter according to the present invention for multiple chip rates WCDMA system, where the carrier frequency of the first chip rate is not the same with that of the second chip rate. Here, the scrambling code and channelization code allocation method for the first chip rate and second chip rate is the same with that of the same carrier frequency for first and second chip rate.

FIG. 6 shows an example of OVSF code which can be used as a channelization code of second chip rate, where the second chip rate is double the first chip rate. FIG. 8 shows an example of OVSF code which can be used as a channelization code of second chip rate, where the second chip rate is four times the first chip rate. In FIG. 8, four OVSF code groups are described, and the priority among those four OVSF code groups has been described above.

The transmitter in FIG. 9 is the same as that of FIG. 7 except the last four mixers. Particularly, the seventh mixer (722) loads the output real number signal of said first pulse waveform filter (714) to the carrier wave by multiplying $\cos(\omega_1 t)$, and an eighth mixer (723) loads the output imaginary number signal of said second pulse waveform filter (715) to the carrier wave by multiplying $-\sin(\omega_1 t)$ A ninth mixer (724) loads the output real number signal of said third pulse waveform filter (716) to the carrier wave by multiplying $\cos(\omega_2 t)$, and a tenth mixer (725) loads the output imaginary number signal of said fourth pulse waveform filter (717) to the carrier wave by multiplying $-\sin(\omega_2 t)$.

Here, the first chip rate is lower than the second chip rate, $\omega_1$ is the carrier angular frequency of first chip rate, and $\omega_2$ is the carrier angular frequency of second chip rate. The time-sync of two chip rate signals are maintained to preserve the orthogonality of OVSF codes.

The method of present invention may be applied by examining a computer simulation results, in which the carrier angular frequency of first chip rate is different from that of second chip rate and the second chip rate is multiple of the first chip rate, and both the two signals are transmitted concurrently.

FIGS. 10–13 are illustrative graphs which show the difference of the interference to the signal having first chip rate due to the signal having second chip rate, which is the double the first chip, when the carrier frequencies of the two are different.

Figure 10:
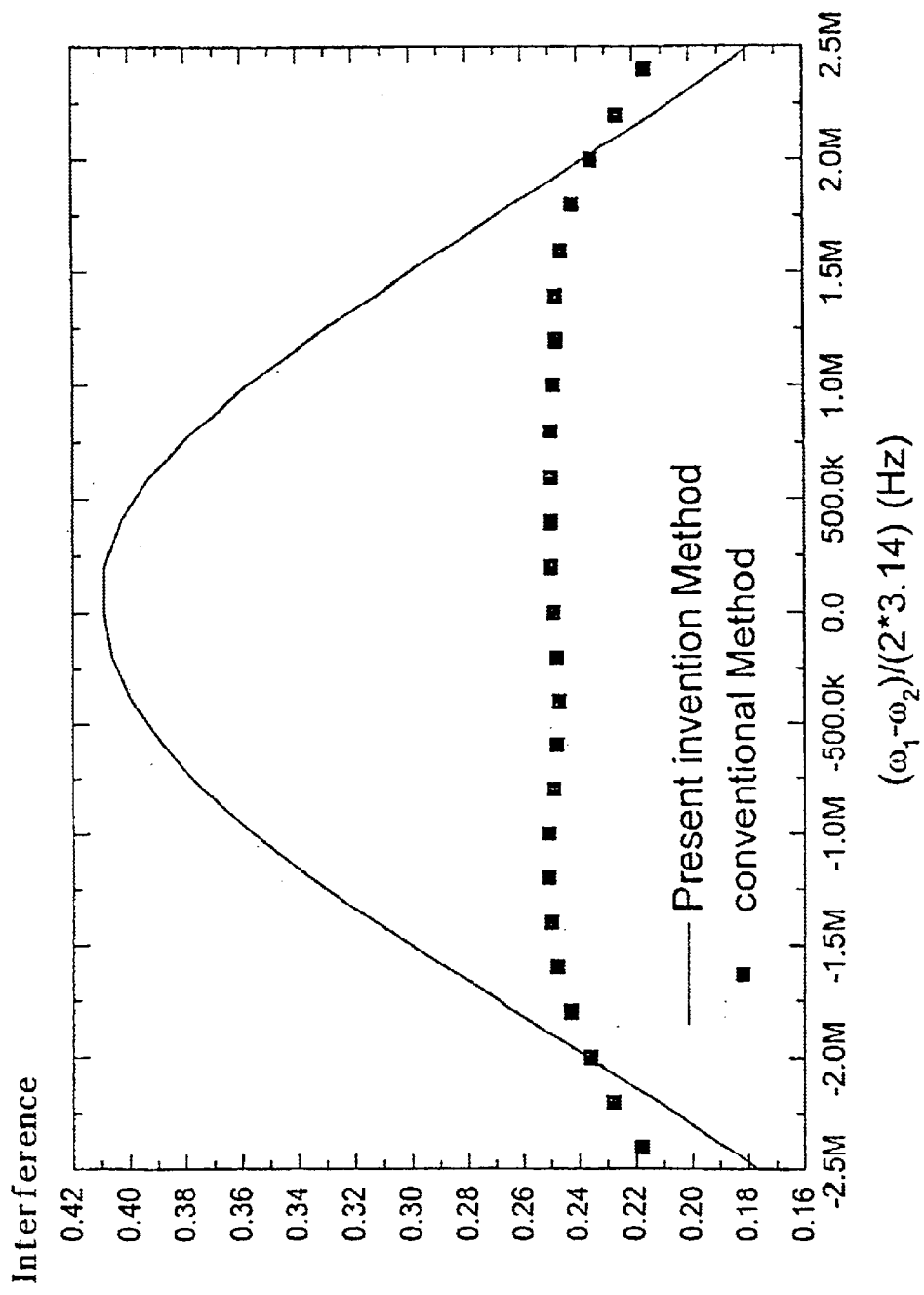
FIG. 10 shows an interference to the channelization code of first chip rate $C_{ch,4,0}$ due to the channelization code of second chip rate $C_{ch,4,0}$.
Figure 11:
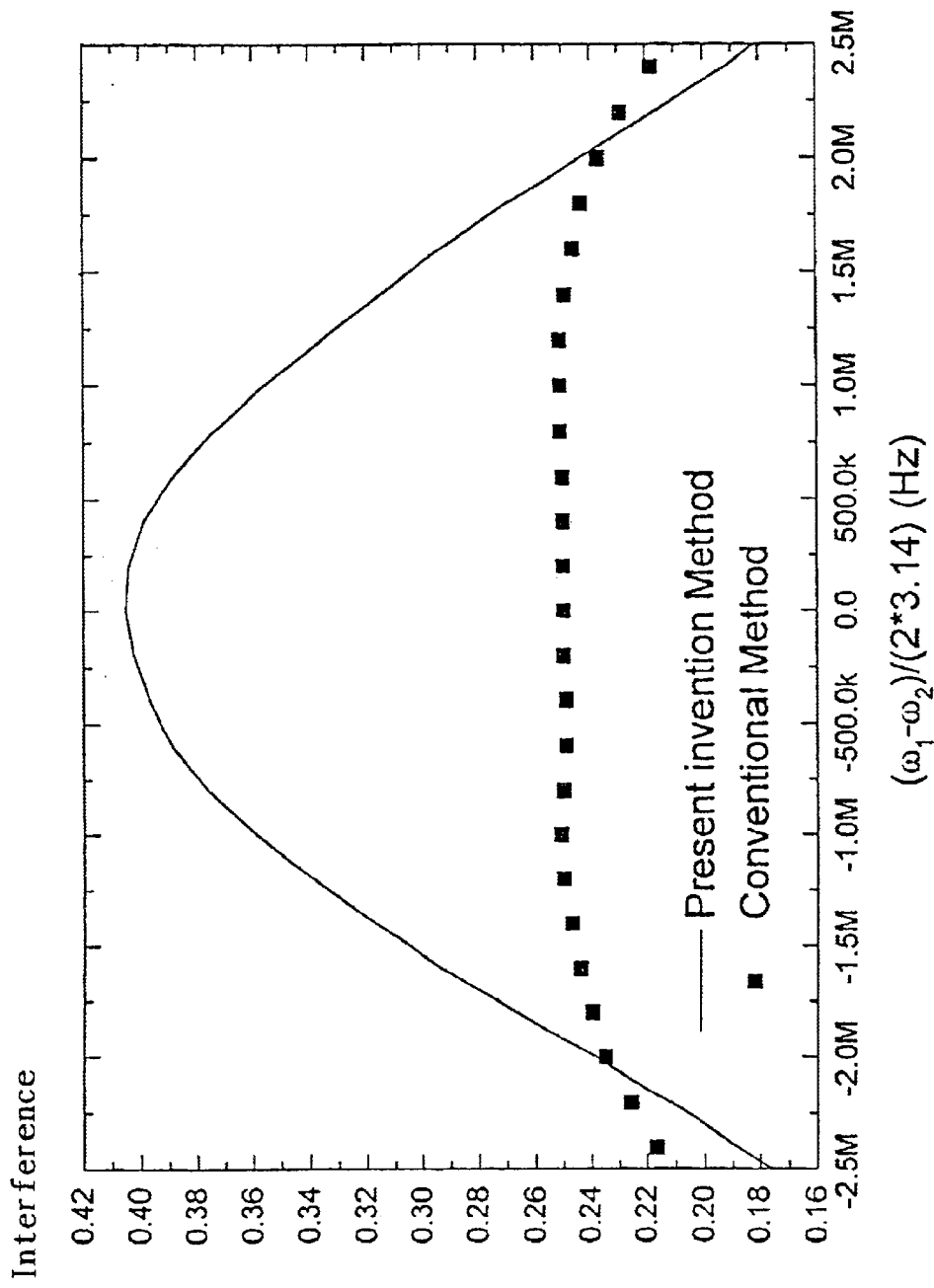
FIG. 11 shows an interference to the channelization code of first chip rate $C_{ch,4,0}$ due to the channelization code of second chip rate $C_{ch,4,1}$.
Figure 12:
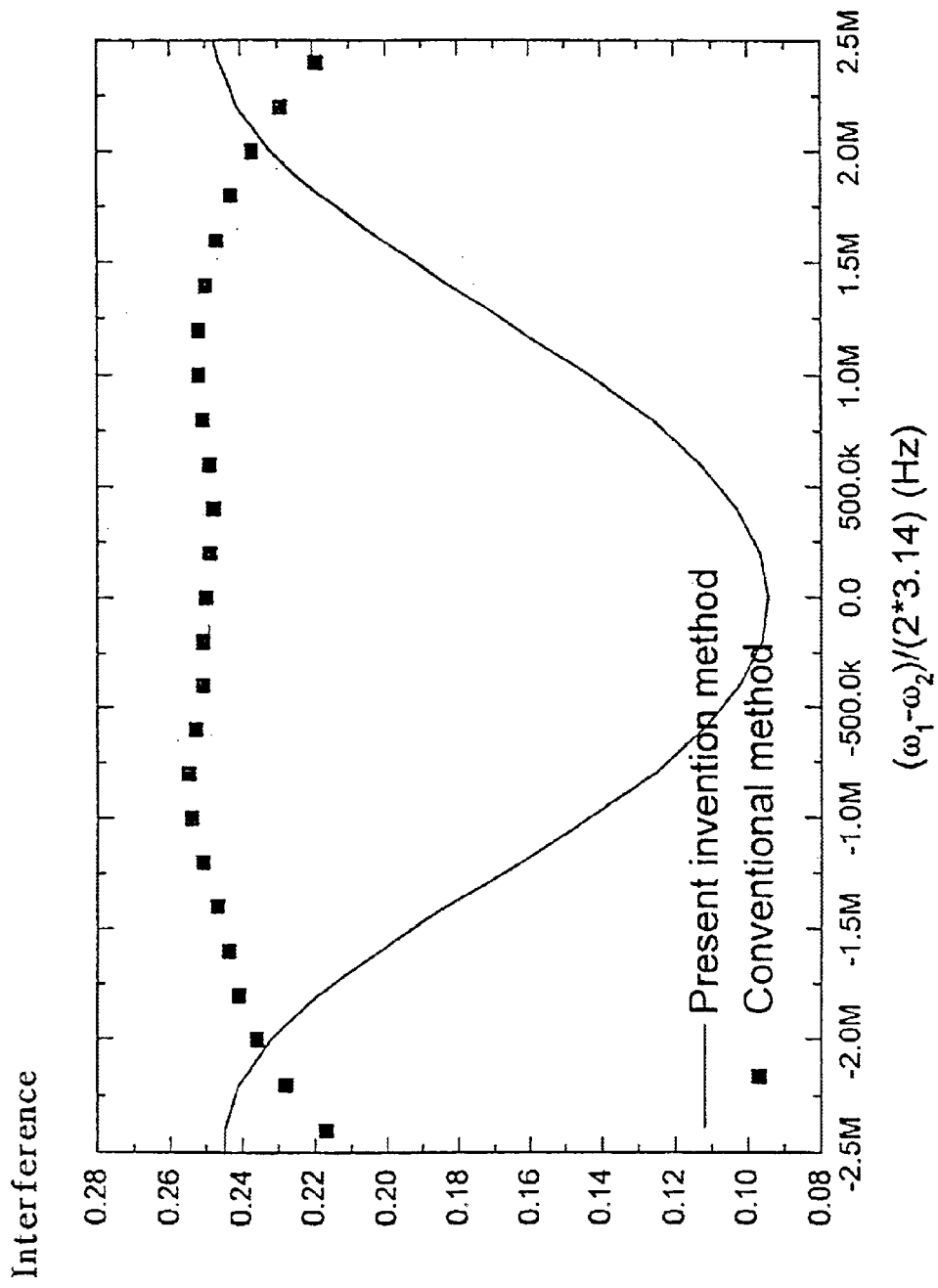
FIG. 12 shows an interference to the channelization code of first chip rate $C_{ch,4,0}$ due to the channelization code of second chip rate $C_{ch,4,2}$.
Figure 13:
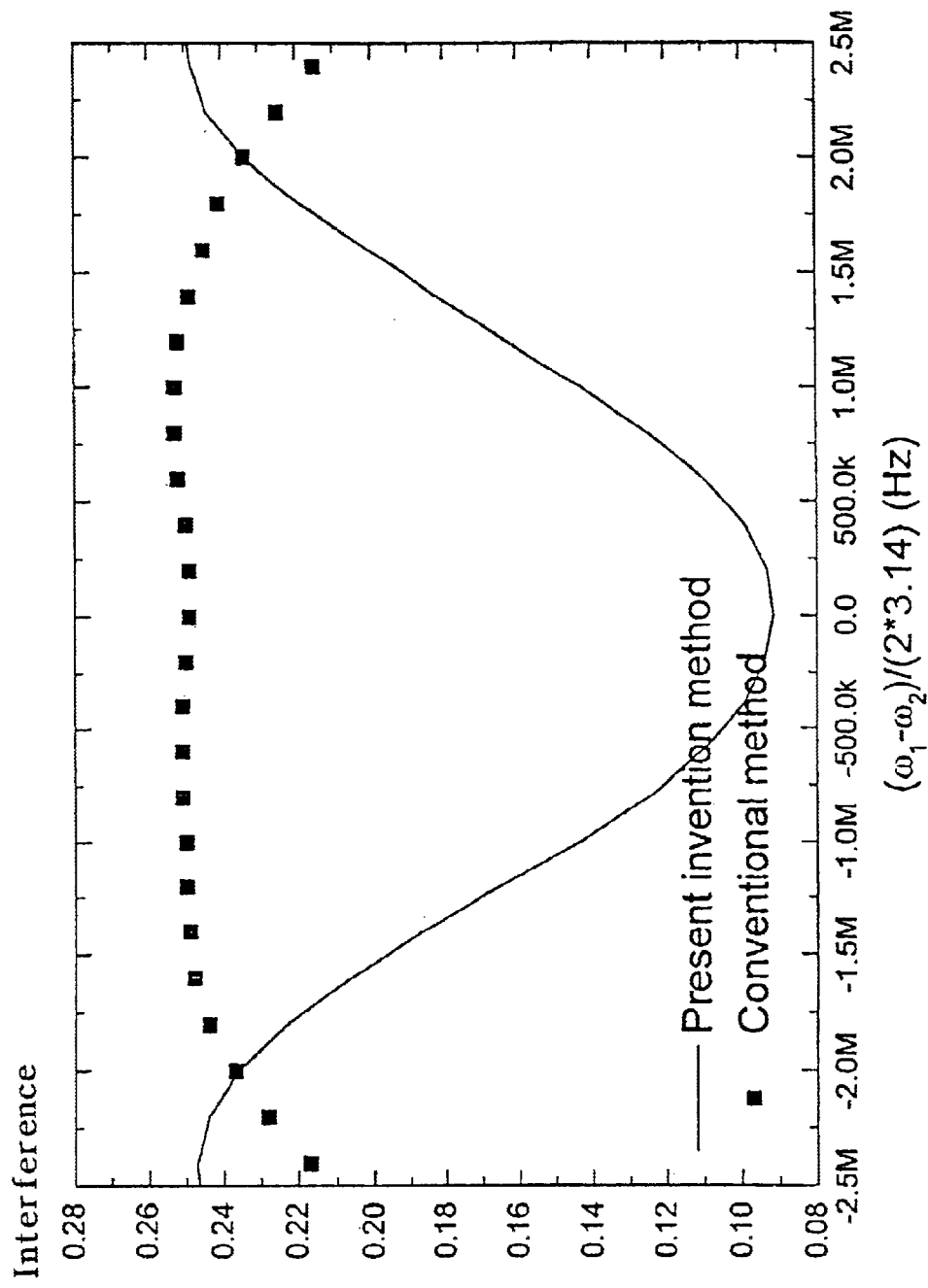
FIG. 13 shows an interference to the channelization code of first chip rate $C_{ch,4,0}$ due to the channelization code of second chip rate $C_{ch,4,3}$.

Particularly, FIG. 10 shows the interference to the channelization code of first chip rate $C_{ch,4,0}$ due to the channelization code of second chip rate $C_{ch,4,0}$ with respect to the difference between the carrier angular frequencies of the first chip rate and the second chip rate. FIG. 11 shows the interference to the channelization code of first chip rate $C_{ch,4,0}$ due to the channelization code of second chip rate $C_{ch,4,1}$ with respect to the difference between the carrier angular frequencies of the first chip rate and the second chip rate. FIG. 12 shows the interference to the channelization code of first chip rate $C_{ch,4,0}$ due to the channelization code of second chip rate $C_{ch,4,2}$ with respect to the difference between the carrier angular frequencies of the first chip rate and the second chip rate. FIG. 13 shows the interference to the channelization code of first chip rate $C_{ch,4,0}$ due to the channelization code of second chip rate $C_{ch,4,3}$ with respect to the difference between the carrier angular frequencies of the first chip rate and the second chip rate.

Referring to FIGS. 10–13, the level of interference caused in the present invention using the scrambling code of first chip rate commonly, and the level of interference caused in the related art using the scrambling code of first chip rate for the signal of first chip rate and using the scrambling code of second chip rate for the signal of second chip rate varies with respect to the carrier angular frequency of both two chip rates and to the index of channelization code used.

In obtaining the interference level of the signal of second chip rate to the signal of first chip rate shown in FIGS. 10–13, $C_{ch,4,2}$ and $C_{ch,4,3}$ is used as the channelization code of second chip rate when the difference between the carrier angular frequency of two chip rates is approximately under 2 MHz, and $C_{ch,4,0}$ and $C_{ch,4,1}$ is used as the channelization code of second chip rate when the difference between the carrier angular frequency of two chip rates is approximately over 2 MHz.

The tendency above could be found in signals of all spreading factor and of all chip rates. Because there are numerous second chip rates which are multiple of integer of first chip rate, and numerous values of the angular frequency of first frequency and second frequency, the method for allocating channel code to first chip rate and second chip rate for all cases cannot each be described. However, in analogous manner as described above, various applications and modifications of present invention can be made.

In the present invention, the transmitter side is described, but the same idea of present invention should be applied to a receiver side since the receiver operation is inverse of transmitter operation. For example, the descrambling code with lower chip rate should be used for descrambling code for lower chip rate and higher chip rate. Moreover, in the present system, various applications and modifications can be made to a case where more than 3 chip rates exists concurrently.

The present invention can be also applied to wireline communication link, optical fiber communication link, twisted copper wire communication link, coaxial cable communication link, and satellite communication link.

As mentioned above, the present invention enhances the capacity of transmitting data of multiple chip rate in a CDMA mobile communication system by allocating channelization code and scrambling code in multiple code rate, thereby allowing a transmission of signals of multiple chip rates with minimized interference in the environment where various user signals exist in a overlaid carrier frequency band.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method of allocating channelization codes for transmission of signals in multiple code rates in a mobile communication system comprising:

generating quasi orthogonal muti chip rate (QOMCR) codes from orthogonal variable spreading factor (OVSF) codes;

allocating OVSF codes as channelization codes for signals of a first chip rate; and allocating QOMCR codes as channelization codes for signals of a second chip rate, where said first chip rate is lower than the second chip rate.

2. A method of claim 1, further comprising scrambling signals of said first chip rate and signals of said second chip rate with scrambling codes having a same chip rate and a same scrambling code sequence pattern.

3. A method of claim 2, wherein scrambling codes of the first chip rate are used for signals of both said first and second chip rates.

4. A method of claim 1, wherein the second chip rate is $2^Y$ times the first chip rate, where Y is a positive integer, and wherein generating QOMCR codes comprises finding codes from the OVSF codes in which a combination of $2^Y$ code bits result in a value of zero, if a pulse shaping function is rectangular.

5. A method of claim 4, wherein generating QOMCR codes comprises finding codes from the OVSF codes in which a combination of two code bits results in a value of zero if the second chip rate is twice the first chip rate, and wherein generating QOMCR codes comprises finding codes from OVSF codes in which a combination of four code bits result in a value of zero if the second chip rate is four times the first chip rate.

6. A method of claim 1, wherein the second chip rate is $2^Y$ times the first chip rate, where Y is a positive integer, and wherein generating QOMCR codes comprises finding codes from the OVSF codes in which a combination of $2^Y$ code bits result in a value of zero and which has point symmetry, if a pulse shaping function is symmetrical.

7. A method of claim 1, wherein generating QOMCR codes comprises finding codes from the OVSF codes in which a combination of 2 code bits result ill a value of zero if the second chip rate is twice the first chip rate, and wherein generating QOMCR codes comprises finding codes from OVSF codes in which a combination of four code bits result in a value of zero if the second chip rate is four times the first chip rate.

8. A method of claim 1, wherein the second chip rate is $2^y$ times the first chip rate, where Y is a positive integer, and wherein allocating QOMCR codes to the signals of the second chip rate comprises dividing the generated QOMCR codes into $2^y$ groups and selecting a group of QOMCR codes which causes the least interference to the signals of the first chip rate.

9. A method of claim 8, wherein allocating QOMCR codes to the signals of the second chip rate comprises dividing the generated QOMCR codes into a first group of $C_{ch,sf2,n2}$ where n2={0, 1, ..., sf2/2−1} and a second group of $C_{ch,sf2,n2}$ where n2={sf2/2, sf2/2+1, ..., sf2−1} for a spreading factor of sf2, if the second chip rate is twice the first chip rate.

10. A method of claim 9, wherein allocating the second group to the signals of the second chip rate.

11. A method of claim 8, wherein allocating QOMCR codes to the signals of the second chip rate comprises dividing the generated QOMCR codes into a first group of $C_{ch,sf2,n2}$ where n2={0, 1, ..., sf2/4−1}, a second group of $C_{ch,sf2,n2}$ where n2={sf2/4, sf2/4+1, ..., sf2/2−1}, a third group of $C_{ch,sf2,n2}$ n2={sf2/2, sf2/2+1, ... 3*sf2/4−1}, and a fourth group of $C_{ch,sf2,n2}$ where n2={3*sf2/4, 3*sf2/4+1, ..., sf2−1} for a spreading factor of sf2, if the second chip rate is four times the first chip rate.

12. A method of claim 11, wherein allocating to the signals of the second chip rate the fourth group as the channelization codes, and if the fourth group is unavailable, allocating the third group as the channelization codes if said spreading factor sf2 is not greater than 256, and otherwise allocating either one of the second or third group as channelization codes.

13. A method of claim 12, wherein allocating the second group if an interference of signals of the first chip rate to signals of the second chip rate is more of a critical factor than an interference of signals of the second chip rate to signals of the first chip rate, and otherwise allocating the third group.

14. The method of claim 1, wherein generating QOMCR codes comprises:
generating QOMCR codes from the OVSF codes;
foaming groups of the generated QOMCR codes; and
selecting a group of the generated QOMCR codes for allocation.

15. The method of claim 14, wherein the selected group of the generated QOMCR codes causes least interference to signals having the first chip rate.

16. The method of claim 14, wherein generating QOMCR codes comprises:
generating QOMCR codes from the OVSF codes;
forming groups of the generated QOMCR codes; and
selecting a group of the generated QOMCR codes for allocation.

17. The method of claim 16, wherein the selected group of the generated QOMCR codes causes least interference to signals having the first chip rate.

18. A method of allocating channelization codes for transmission of signals in multiple code rates in a mobile communication system comprising:
generating quasi orthogonal muti chip rate (QOMCR) codes from orthogonal variable spreading factor (OVSF) codes;
allocating OVSF codes as channelization codes for signals of a first chip rate;
allocating QOMCR codes as channelization codes for signals of a second chip rate, wherein the second chip rate is $2^y$ times the first chip rate where y is a positive integer; and
scrambling signals of said first chip rate and signals of said second chip rate with scrambling codes of said first chip rate.

19. A method of claim 18, wherein generating QOMCR codes comprises finding codes from the OVSF codes in which a combination of $2^y$ code bits result in a value of zero, if a pulse shaping function is rectangular.

20. A method of claim 18, wherein generating QOMCR codes comprises finding codes from the OVSF codes in which a combination of $2^y$ code bits result in a value of zero and which has point symmetry, if a pulse shaping function is symmetrical.

21. A method of claim 18, wherein allocating QOMCR codes to the signals of the second chip rate comprises dividing the generated QOMCR codes into $2^y$ groups and selecting a group of QOMCR codes which causes the least interference to the signals of the first chip rate.

22. A method comprising:
allocating a orthogonal variable spreading factor (OVSF) code as a channelization code for signals to have a first chip rate; and
allocating a quasi orthogonal multi chip rate (QOMCR) code as a channelization code for signals to have a second clip rate, said second chip rate being higher than the first chip rate.

23. The method of claim 22, further comprising:
determining the QOMCR code from OVSF codes.

24. The method of claim 23, wherein determining the QOMCR code comprises determining codes from the OVSF codes in which a combination of code bits result in a value of zero.

25. The method of claim 23, wherein determining the QOMCR code comprises:
generating QOMCR codes from the OVSF codes;
dividing the generated QOMCR codes into groups; and
selecting a group of QOMCR codes that causes least interference to the signals to have the first chip rate.

26. The method of claim 22, further comprising scrambling signals of said first chip rate and signals of said second chip rate with scrambling codes having a same chip rate and a same scrambling code sequence pattern.

27. The method of claim 22, wherein scrambling codes of the first clip rate are used for signals of both said first and second chip rates.

28. The method of claim 22, wherein the second chip rate is $2^y$ times the first chip rate.

* * * * *